United States Patent
Hisada et al.

(10) Patent No.: US 7,396,562 B2
(45) Date of Patent: Jul. 8, 2008

(54) OPTICAL INFORMATION-RECORDING MEDIUM MANUFACTURING METHOD AND MANUFACTURING APPARATUS

(75) Inventors: Kazuya Hisada, Osaka (JP); Eiji Ohno, Hirakata (JP); Kazuhiro Higashimaru, Kadoma (JP); Kazuhiro Hayashi, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 742 days.

(21) Appl. No.: 10/479,589

(22) PCT Filed: Jun. 6, 2002

(86) PCT No.: PCT/JP02/05588

§ 371 (c)(1),
(2), (4) Date: Jul. 27, 2004

(87) PCT Pub. No.: WO02/101737

PCT Pub. Date: Dec. 19, 2002

(65) Prior Publication Data

US 2004/0252626 A1     Dec. 16, 2004

(30) Foreign Application Priority Data

Jun. 6, 2001     (JP) .............................. 2001-171371
Aug. 9, 2001     (JP) .............................. 2001-242356

(51) Int. Cl.
*B05D 3/06*     (2006.01)
*B05D 3/12*     (2006.01)

(52) U.S. Cl. ................ 427/240; 427/512; 427/553; 427/558; 427/595; 427/425; 118/52; 118/320

(58) Field of Classification Search ............... 427/240, 427/425, 512, 553, 558, 595; 118/52, 320
See application file for complete search history.

(56) References Cited

U.S. PATENT DOCUMENTS

| 5,071,673 | A | 12/1991 | Anezaki et al. |
| 6,063,468 | A | 5/2000 | Aratani et al. |
| 6,613,396 | B1 * | 9/2003 | Nishida et al. ............ 427/512 |
| 6,898,796 | B2 * | 5/2005 | Komaki et al. ............ 720/724 |

FOREIGN PATENT DOCUMENTS

| EP | 0 440 214 | 8/1991 |
| JP | 1-286146 | 11/1989 |

(Continued)

*Primary Examiner*—Kirsten C Jolley
(74) *Attorney, Agent, or Firm*—Wenderoth, Lind & Ponack, L.L.P.

(57) ABSTRACT

A method of manufacturing an optical information recording medium that has a substrate having a signal recording layer formed on one principal surface thereof; and an optically transparent layer formed on the signal recording layer and made from a radiation cure type resin. According to the method, when the optically transparent layer is formed, the radiation cure type resin is supplied onto the substrate, and the radiation cure type resin is applied over the substrate by spinning the substrate at a predetermined number of application revolutions in a spin coating method. The number of revolutions of the substrate is increased after the application of the resin, and radiation is irradiated to cure the radiation cure type resin while the number of revolutions of the substrate is increased.

11 Claims, 29 Drawing Sheets

FOREIGN PATENT DOCUMENTS

| | | |
|---|---|---|
| JP | 1-299670 | 12/1989 |
| JP | 3-224145 | 10/1991 |
| JP | 7-136573 | 5/1995 |
| JP | 8-63815 | 3/1996 |
| JP | 9-161341 | 6/1997 |
| JP | 9-293280 | 11/1997 |
| JP | 10-97741 | 4/1998 |
| JP | 10-199056 | 7/1998 |
| JP | 10-302309 | 11/1998 |
| JP | 11-31337 | 2/1999 |
| JP | 11-86356 | 3/1999 |
| JP | 11-162015 | 6/1999 |
| JP | 11-195251 | 7/1999 |
| JP | 11-203724 | 7/1999 |
| JP | 11-213459 | 8/1999 |
| JP | 3104092 | 9/2000 |
| JP | 2000-311390 | 11/2000 |
| JP | 2000-311391 | 11/2000 |
| JP | 2001-126318 | 5/2001 |
| JP | 2001-307391 | 11/2001 |
| KR | 2000-0051973 | 8/2000 |

* cited by examiner

Fig. 28A
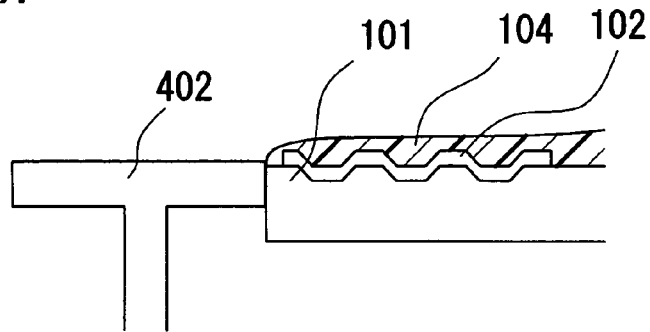
Fig. 28B
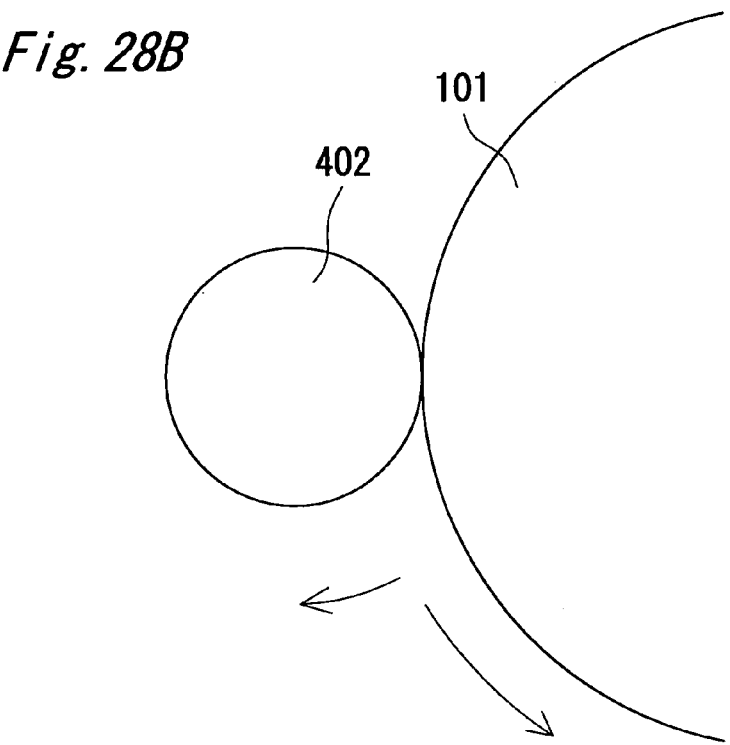
Fig. 28C
Fig. 28D
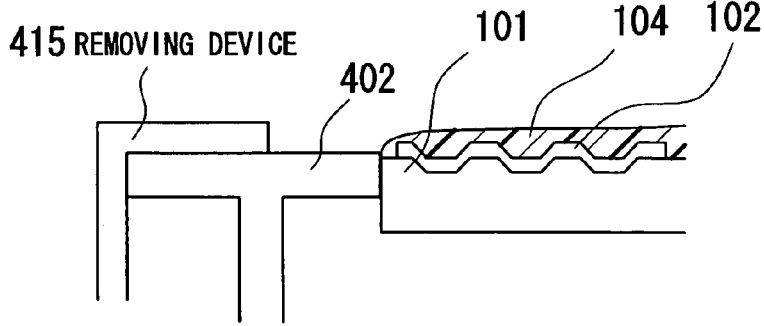
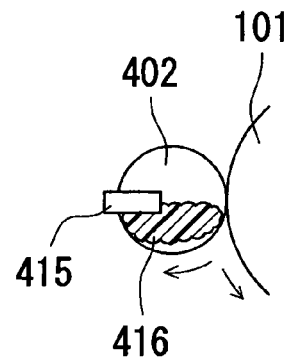

OPTICAL INFORMATION-RECORDING MEDIUM MANUFACTURING METHOD AND MANUFACTURING APPARATUS

TECHNICAL FIELD

The invention relates to a technique for manufacturing an optical information recording medium and specifically to a method of and an apparatus for manufacturing an optical information recording medium that has a very uniform optically transparent layer.

BACKGROUND ART

In recent years, various types of optical recording have been investigated in the field of information recording. In the optical information recording system, recording/reproducing can be made at high density and low cost with a non-contact mechanism, and its applications have now become widespread. At present, for example, an available optical disk has a structure in which an information layer is formed on a transparent resin substrate with a thickness of 1.2 mm and protected by an overcoat; or a structure in which two transparent resin substrates each with a thickness of 0.6 mm and an information layer provided on one or both sides of the substrate are bonded to each other.

In recent years, the way to increase the recording density of the optical disk has been investigated, for example, including increasing a numerical aperture of objective lens and shorting a wavelength of a laser beam. If the substrate on the recording/reproducing side (the substrate on the incident laser beam side) has a relatively small thickness, the laser beam spot can be less affected by aberration, and therefore, the disk can have a relatively large tolerance for the inclination angle (tilt). From this point of view, it has been proposed that the recording/reproducing side substrate should have a thickness of 0.1 mm, the NA be about 0.85 and the laser beam have a wavelength of about 400 nm. Under such conditions, variations in thickness of the recording/reproducing side substrate should preferably be controlled to 5% or less, in terms of the influence of recording/reproducing light on focus or spherical aberration.

A potential way to control the variations in thickness to such a small value may include bonding substrate sheets each having a uniform thickness of a few tens of µm to each other with a radiation cure type resin. However, the process using such substrate sheets is very expensive. Therefore, a spin coating method should preferably be used to form the base material only from a radiation cure type resin on the recording/reproducing side.

DISCLOSURE OF THE INVENTION

The process of forming the recording/reproducing side substrate (optically transparent layer) in a spin coating method has difficulty in making the thickness uniform ranging from the inner radius to the outer radius. Specifically, the thickness tends to be made small at the inner radius and significantly large at the outer end. If a radiation cure type resin on the substrate being rotated is cured by radiation for the purpose of making the thickness uniform in the vicinity of the outer end, burrs can be generated at the periphery portion, which can lead to problems with the mechanical characteristics and the appearance.

Against the above problems, it is an object of the invention to provide a method of manufacturing an optical information recording medium, in which a uniform optically transparent layer can be formed. It is another object of the invention to provide a method of manufacturing an optical information recording medium, in which burrs can be prevented from being generated at the outer end of the substrate.

In a first aspect of the invention, provided is a method of manufacturing an optical information recording medium that has a substrate having a signal recording layer formed on one principal surface thereof; and an optically transparent layer formed on the signal recording layer and made from a radiation cure type resin. According to the method, when the optically transparent layer is formed, the radiation cure type resin is supplied onto the substrate, and the radiation cure type resin is applied over the substrate by spinning the substrate at a predetermined number of application revolutions in a spin coating method. The number of revolutions of the substrate is increased after the application of the resin, and radiation is irradiated to cure the radiation cure type resin while the number of revolutions of the substrate is increased.

In a second aspect of the invention, provided is a method of manufacturing an optical information recording medium that has a substrate having a signal recording layer formed on one principal surface thereof; and an optically transparent layer formed on the signal recording layer and made from a radiation cure type resin. According to the method, when the optically transparent layer is formed, the radiation cure type resin is supplied onto the substrate, and the radiation cure type resin is applied over the substrate by spinning the substrate at a predetermined number of application revolutions in a spin coating method. The number of revolutions of the substrate is increased to a predetermined number of revolutions that is greater than the predetermined number of application revolutions after the application of the resin, and the predetermined number of revolutions for a predetermined period is maintained after the number of revolutions reaches the predetermined number of revolutions. Radiation is irradiated to cure the radiation cure type resin while spinning the substrate at the predetermined number of revolutions, after the number of revolutions reaches the predetermined number of revolutions.

In a third aspect of the invention, provided is a method of manufacturing an optical information recording medium that has a substrate having a signal recording layer formed on one principal surface thereof; and an optically transparent layer formed on the signal recording layer and made from a radiation cure type resin. According to the method, when the optically transparent layer is formed, supplying the radiation cure type resin onto the substrate is started while spinning the substrate at a speed lower than a predetermined speed. Applying the radiation cure type resin over the substrate is started while spinning the substrate at a speed higher than the lower speed. Then the supplying the radiation cure type resin is stopped, and then the applying the radiation cure type resin is stopped.

In a fourth aspect of the invention, provided is a method of manufacturing an optical information recording medium that has a substrate having a signal recording layer formed on one principal surface thereof; and an optically transparent layer formed on the signal recording layer and made from a radiation cure type resin. According to the method, when the optically transparent layer is formed, the radiation cure type resin is supplied onto different portions located at substantially the same radius inside the region where the signal recording layer is formed. The supplied radiation cure type resin is applied over the substrate by spreading the supplied radiation cure type resin.

In a fifth aspect of the invention, provided is a method of manufacturing an optical information recording medium that has a substrate having a signal recording layer formed on one principal surface thereof; and an optically transparent layer formed on the signal recording layer and made from a radiation cure type resin. According to the method, when the optically transparent layer is formed, supplied is the radiation cure type resin in the shape of a ring at substantially the same radius inside the region where the signal recording layer is formed. The supplied radiation cure type resin is applied over the substrate by spreading the supplied radiation cure type resin.

In a sixth aspect of the invention, provided is a method of manufacturing an optical information recording medium that comprises a substrate having a central hole and a signal recording layer formed on one principal surface thereof; and an optically transparent layer formed on the signal recording layer and made from a radiation cure type resin. According to he method, the radiation cure type resin is supplied onto the substrate, and the supplied radiation cure type resin is spread and applied over the substrate, thereby forming the optically transparent layer. During the supplying the radiation cure type resin, the central hole is blocked with a member having a sealing to prevent the radiation cure type resin from leaking into at a portion adjacent to the substrate.

In a seventh aspect of the invention, provided is a method of manufacturing an optical information recording medium that has a substrate having a signal recording layer formed on one principal surface thereof; and an optically transparent layer formed on the signal recording layer and made from a radiation cure type resin. According to the method, radiation is irradiated to cure the radiation cure type resin while spinning the substrate. When the radiation is irradiated, an end face portion of the substrate is placed in an atmosphere containing an excess amount of oxygen.

In an eighth aspect of the invention, provided is a method of manufacturing an optical information recording medium that comprises a substrate having a signal recording layer formed on one principal surface thereof; and an optically transparent layer formed on the signal recording layer and made from a radiation cure type resin. According to the method, radiation is irradiated to cure the radiation cure type resin while spinning the substrate, and a burr is removed from an outer end face portion of the substrate after the radiation cure type resin is cured.

In a ninth aspect of the invention, provided is a method of manufacturing an optical information recording medium that has a substrate having a signal recording layer formed on one principal surface thereof; and an optically transparent layer formed on the signal recording layer and made from a radiation cure type resin. According to the method, the radiation cure type resin is applied onto the signal recording layer in a spin coating method; and radiation is irradiated to cure the radiation cure type resin while spinning the substrate, so that the optically transparent layer is formed. A predetermined member is placed so as to be substantially in contact with the outer end of the principal surface while the substrate is spinning.

In a tenth aspect of the invention, provided is a method of manufacturing an optical information recording medium that comprises a substrate having a signal recording layer formed on one principal surface thereof; and an optically transparent layer formed on the signal recording layer and made from a radiation cure type resin. According to the method, the radiation cure type resin is applied on the signal recording layer in a spin coating method; and radiation is irradiated to cure the radiation cure type resin while spinning the substrate, so that the optically transparent layer is formed. A high pressure gas jet is applied to at least one portion of the outer end of the principal surface while the substrate is spinning.

In an eleventh aspect of the invention, provided is an apparatus for manufacturing an optical information recording medium that comprises a substrate having a signal recording layer formed on one principal surface thereof; and an optically transparent layer formed on the signal recording layer and made from a radiation cure type resin. The apparatus includes a unit that supplies the radiation cure type resin, a unit that spins the substrate to apply or spread the radiation cure type resin, a unit that irradiates radiation while the substrate is spun to form the optically transparent layer; and a unit that suppresses the generation of burrs at a periphery of the substrate.

BRIEF DESCRIPTION OF THE DRAWINGS

FIGS. 28A and 28B are diagrams illustrating a burr-removing member in the shape of a circular plate placed adjacent to the substrate;

FIGS. 28C and 28D are diagrams illustrating a burr-removing member in the shape of a circular plate and a resin-removing device adjacent thereto;

BEST MODE FOR CARRYING OUT THE INVENTION

Figure 1:
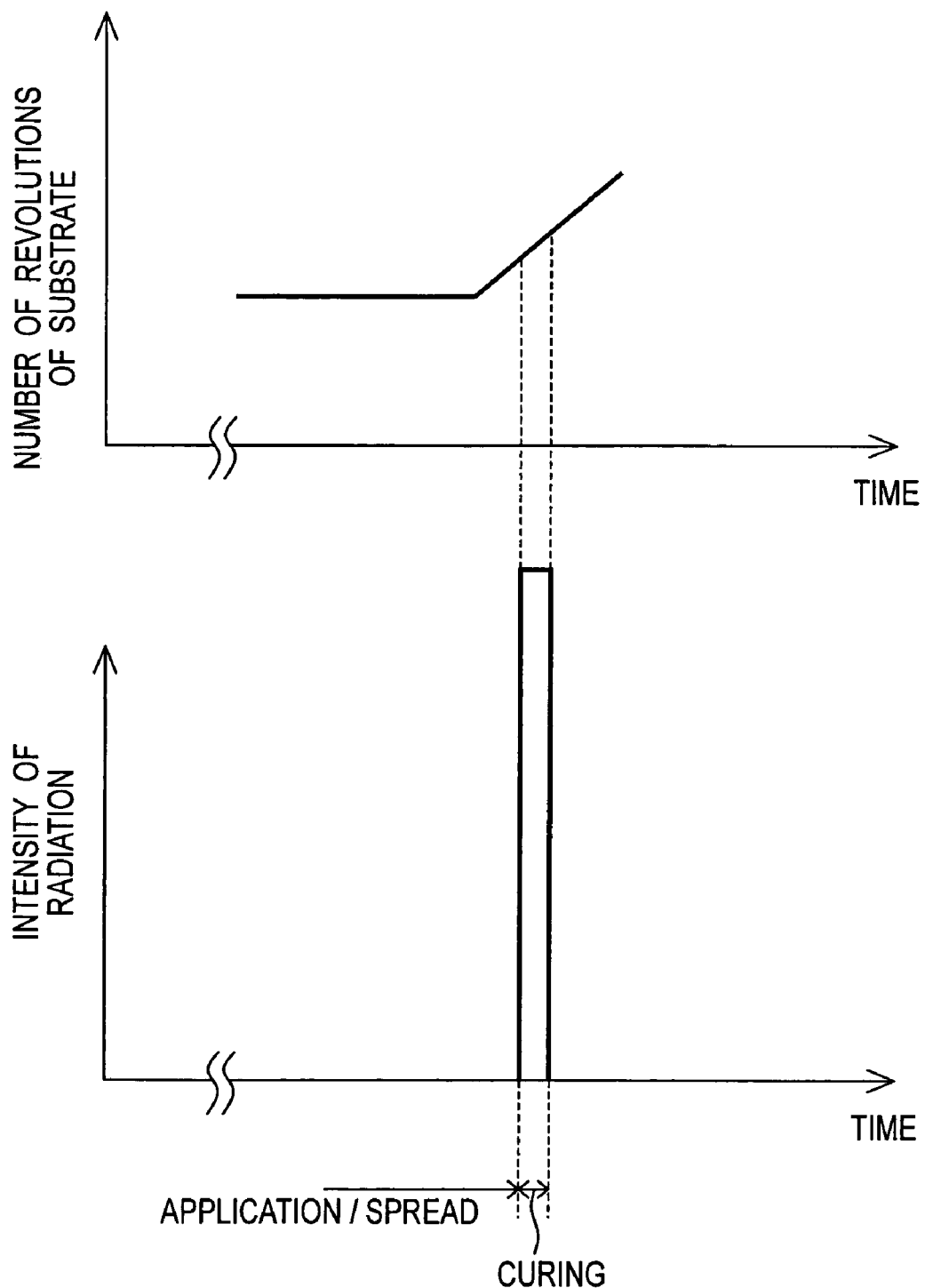
FIG. 1 is a diagram for illustrating a method of manufacturing an optical information recording medium, which specifically shows a timing of a process of curing the resin while the rotation of the substrate is accelerated.

Referring to the Drawings attached hereto, a method of manufacturing the optical information recording medium according to the invention is described in detail below.

First Embodiment

FIG. 1 is a diagram illustrating the timing of the radiation irradiation in a method of manufacturing the optical information recording medium according to the present invention. Referring to the drawing, the process of this embodiment includes the steps of supplying or dropping a radiation cure type resin onto a substrate; spreading (applying) the radiation cure type resin by spinning; and then curing the resin by irradiating radiation, when an optically transparent layer is formed from the resin on the substrate by spin coating. In the process, the rotation of the substrate is accelerated before the radiation is applied, and the radiation is irradiated to cure the radiation cure type resin during the acceleration. Such a process can produce a uniform optically transparent layer. Such a process for manufacturing the optical information recording medium is described in detail below.

Figure 2:
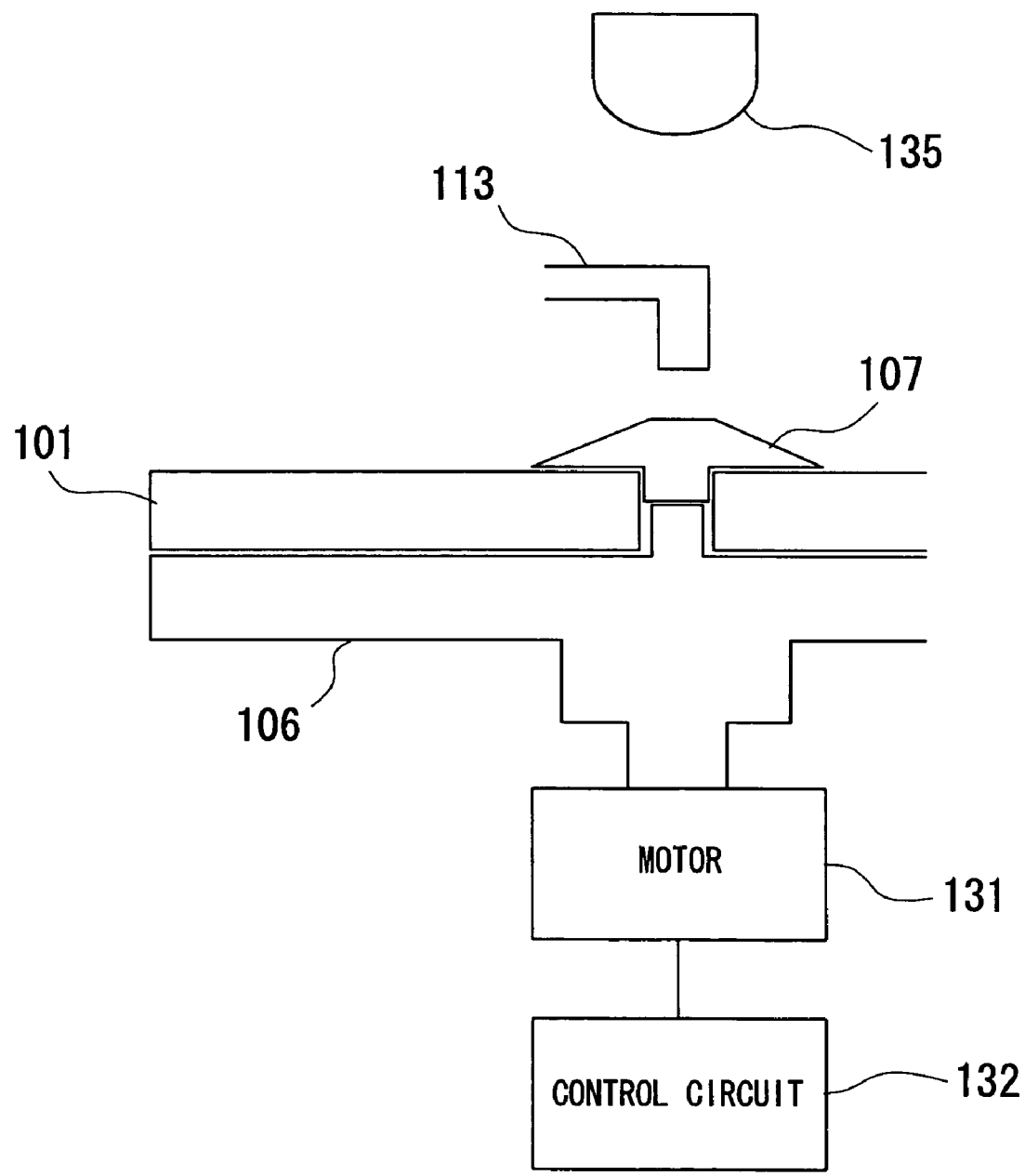
FIG. 2 is a diagram showing a configuration of an apparatus for carrying out the method of manufacturing the optical information recording medium according to the invention.

FIG. 2 shows a configuration of a manufacturing apparatus for carrying out the inventive method of the optical information recording medium according to the invention. The manufacturing apparatus includes a rotary table 106 which mounts a substrate 101 of the optical information recording medium and rotates or spins the substrate 101 at a predetermined speed, a motor 131 for rotating or spinning the rotary table 106, a control circuit 132 for controlling the number of revolutions of the motor 131, a nozzle 113 for supplying or dropping the radiation cure type resin for an optically transparent layer onto the substrate 101, and a lamp 135 for irradiating radiation so that the radiation cure type resin can be cured to form the optically transparent layer. The manufacturing method of optical information recording medium by such an apparatus is described below.

Figure 3A:
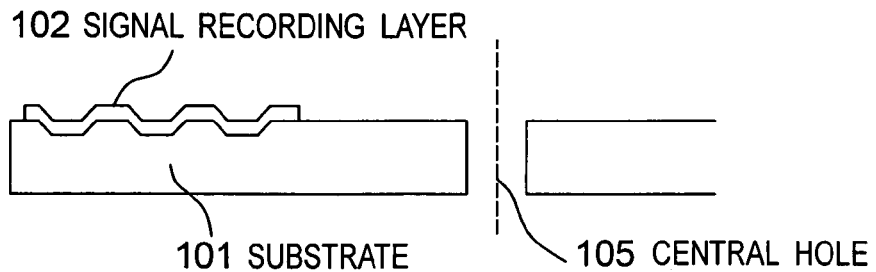
FIGS. 3A to 3C are diagrams for illustrating a method of manufacturing the optical information recording medium.
Figure 3B:
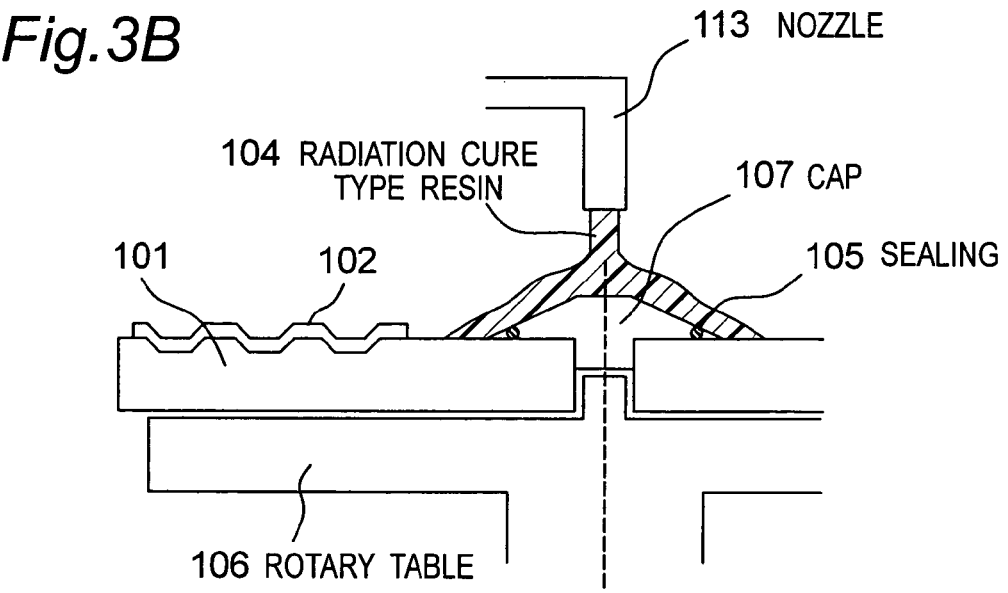

The substrate 101 having a signal recording layer 102, a thickness of 1.1 mm, a diameter of 120 mm, and a central hole 105 with a diameter of 15 mm, as shown in FIG. 3A, is placed on the rotary table 106, and the central hole 105 is blocked with a cap 107, as shown in FIG. 3B. The cap 107 is made of metal and has a sealing 105 made of a Teflon® material at a portion to be in contact with the substrate 101.

While the substrate 101 is at rest or rotated at a low speed of 120 rpm or lower, a radiation cure type resin 104 is started being supplied onto substantially the center of the cap 107 from a nozzle 113. The radiation cure type resin 104 has a viscosity of about 500 mPa·s at room temperature, and the supplying rate is about 1 cm$^3$/s. The viscosity of the radiation cure type resin and the supplying rate are preferably changed depending on the thickness of the optically transparent layer to be formed. In the optical disk for use with an NA of 0.85 and a laser beam with a wavelength of 405 nm, the optically transparent layer should be so formed that variations in its thickness is within about ±2% per about 100 μm thickness and preferably controlled within about ±1%.

If the radiation cure type resin is supplied as near as possible to the center, the thickness of the optically transparent layer formed on the signal recording layer 102 can easily become uniform from the inner radius to the outer radius. In this embodiment, the central hole is blocked with the cap 107, and the radiation cure type resin is supplied onto the cap 107, so that the effect can be maximal.

When the cap 107 used has a conical shape as shown in FIG. 3B, the resin 104 supplied from the cap 107 onto the signal recording layer 102 can be uniform in the circumferential direction, so that the variations can also be small in the radial direction.

Figure 3C:
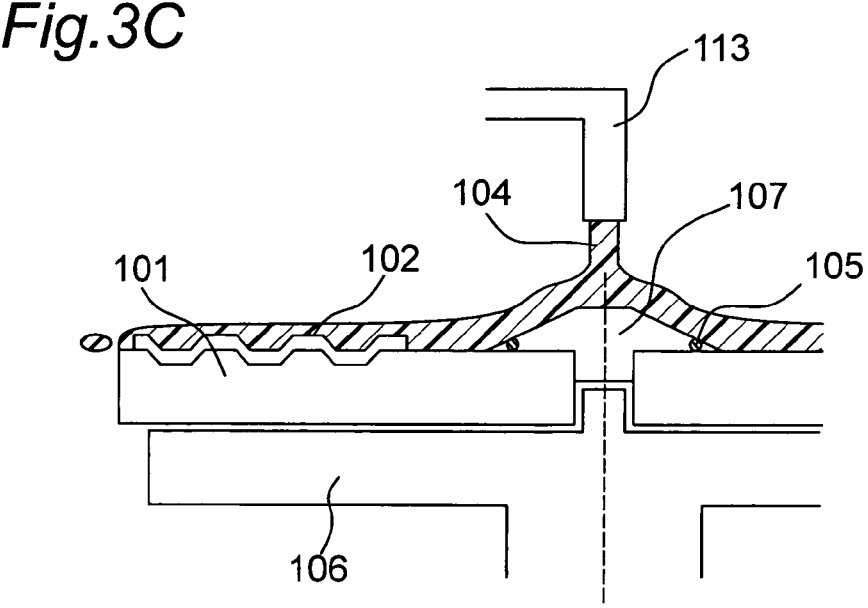
Figure 4A:
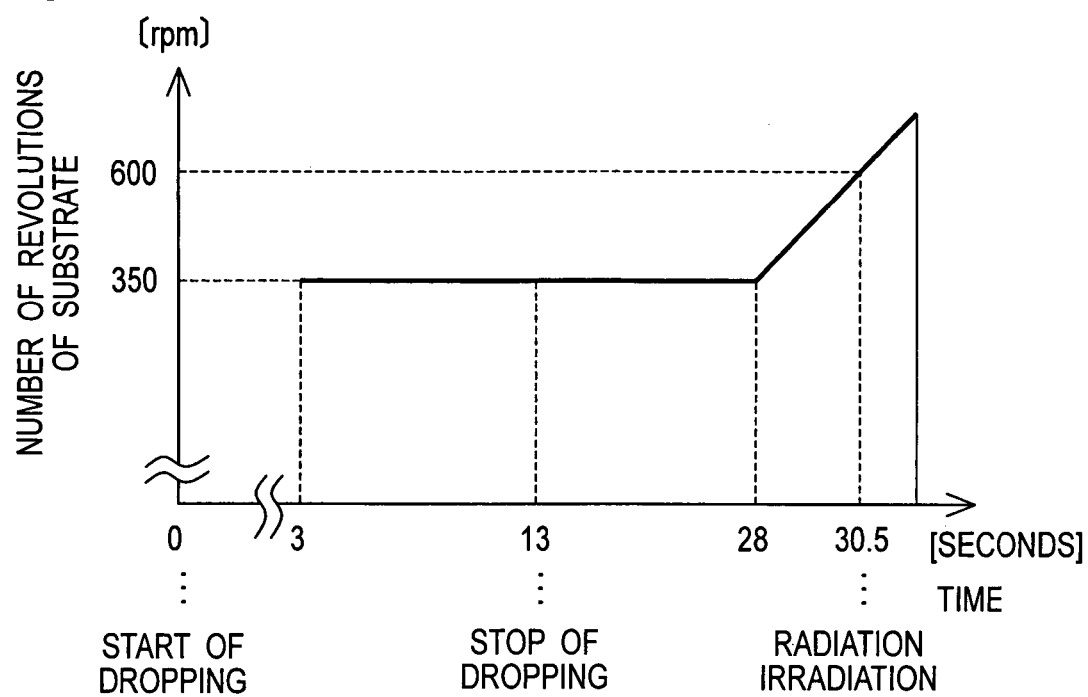
FIGS. 4A and 4B are time charts each showing a timing of each process in the method of manufacturing the optical information recording medium.

Referring to FIG. 3C, while the radiation cure type resin 104 is supplied, the substrate 101 is rotated at about 350 rpm about three seconds after the start of the supplying according to the time chart as shown in FIG. 4A, so that the radiation cure type resin 104 is applied onto the signal recording layer and made uniform. It is noted that the number of revolutions in such an application step is called "the number of application revolutions." The number of application revolutions is preferably changed depending on the thickness or the variations in thickness of the optically transparent layer to be formed.

In the process of the supplying, the radiation cure type resin 104 can penetrate into a very small gap between the cap 107 and the substrate 101. The sealing 105 provided in the cap 107 can prevent such penetration.

Figure 5:
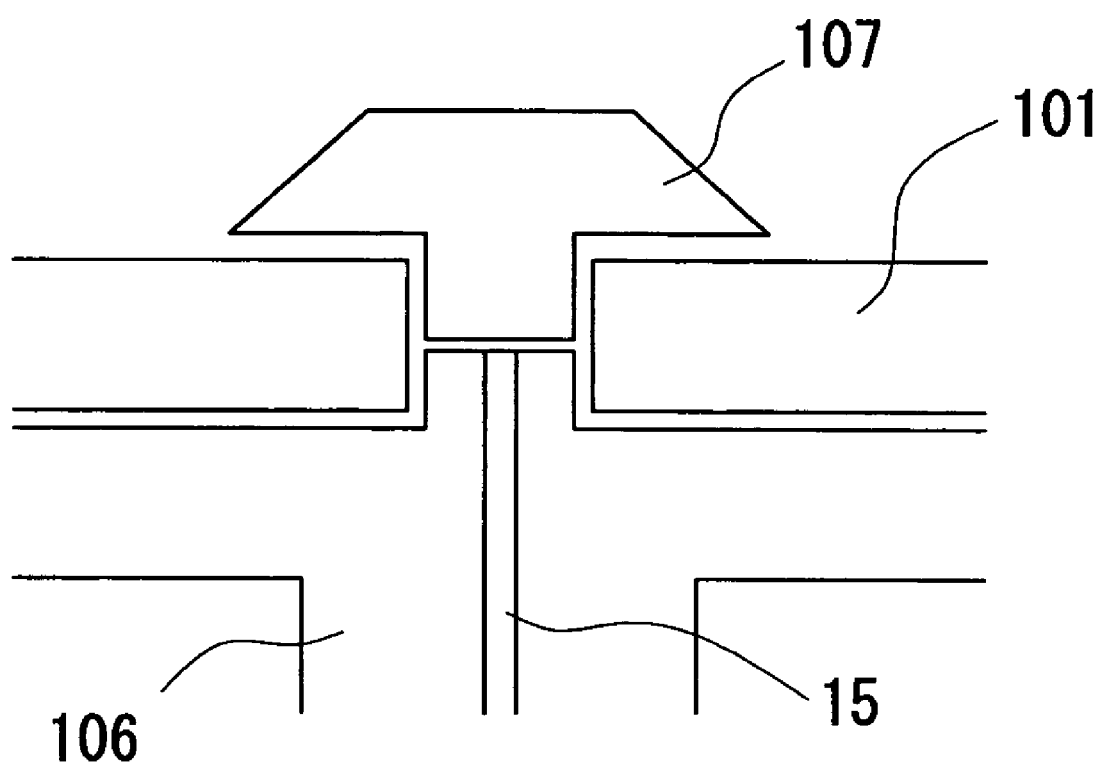
FIG. 5 is a diagram illustrating a mechanism for pulling a cap downward (a mechanism having a suction hole at the center of a rotary table).
Figure 6A:
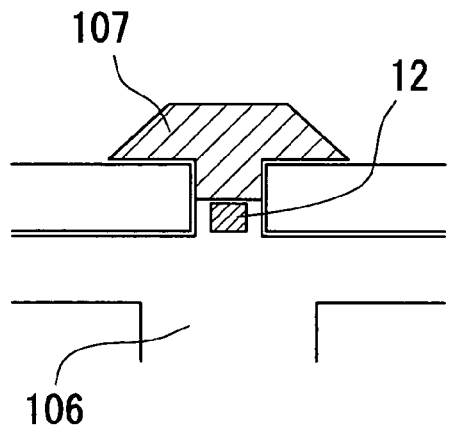
FIGS. 6A to 6C are diagrams illustrating other examples of the mechanism for pulling the cap downward (with a magnet).
Figure 6B:
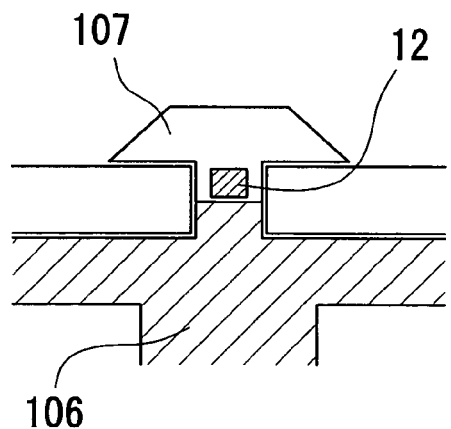
Figure 6C:
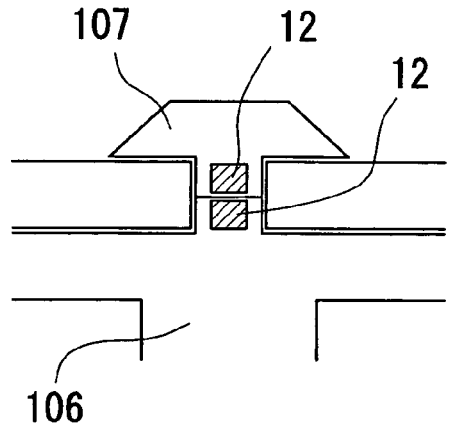

In addition, the effect of preventing the resin penetration can be enhanced by providing a mechanism of pulling the cap 107 downward (in the direction to the table 106). As shown in FIG. 5, for example, such a mechanism may include a suction hole 15 for pulling the cap 107 downward by vacuum at the center of the rotary table 106. Alternatively, as shown in FIGS. 6A to 6C, such a mechanism may include a magnet 12 embedded in the cap 107 and/or the rotary table 106. When the magnet 12 is embedded in one of the cap 107 and the rotary table 106, a part or whole of the other is made of a metallic material.

Referring to FIG. 4A again, the supplying of the radiation cure type resin is stopped about 10 seconds after the start of the 350 rpm rotation. The supplying may be stopped rapidly or the amount of the supplying may be gradually decreased. If the supplying is maintained for a while during the rotation, the feed of the radiation cure type resin can be balanced with the amount of the resin dissipated by spreading, so that uniform application of the radiation cure type resin can be easy.

Figure 7:
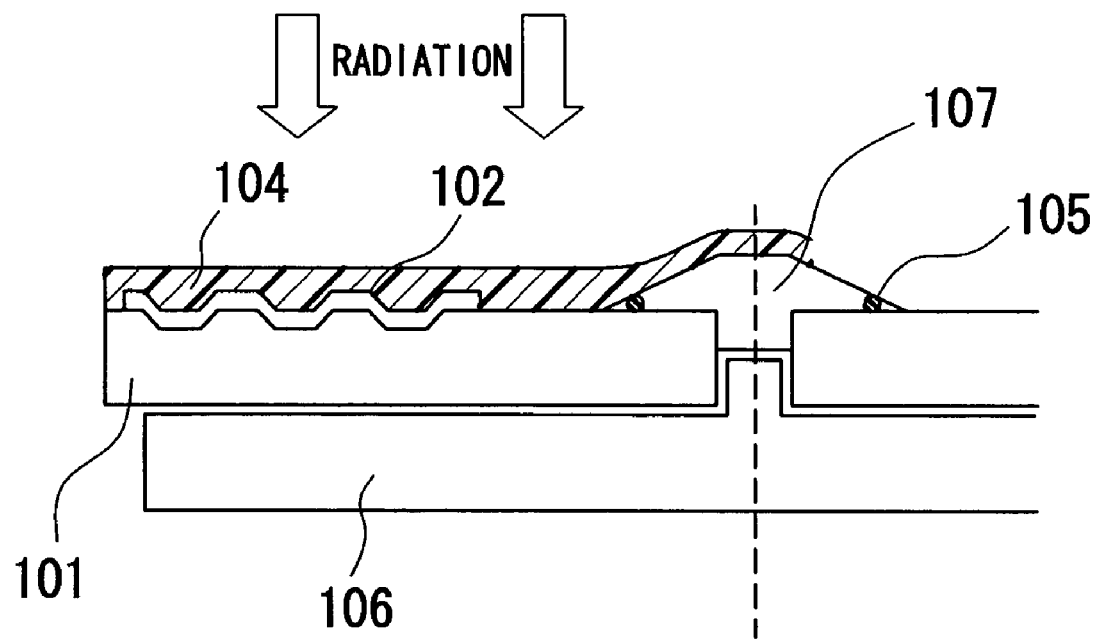
FIG. 7 is a diagram for illustrating a process of curing the radiation cure type resin by irradiating radiation.

In such a balanced state, however, the thickness at the inner radius tends to be slightly greater than that at the outer radius. After the stop of the supplying of the radiation cure type resin 104, therefore, the spreading (application) of the resin 104 is continued for about 15 seconds while the substrate 101 is held rotated at a constant speed. The rotation of the substrate 101 is then accelerated at about 100 rpm/s. Referring to FIG. 7, when the number of revolutions of the substrate 101 reaches about 600 rpm during the acceleration, radiation 110 is irradiated to cure the radiation cure type resin while the substrate 101 is accelerated. By such a process, the optically transparent layer can be formed uniformly up to the vicinity of the outer end of the substrate 101. After the radiation cure type resin 104 is cured, the rotation of the substrate 101 is stopped.

Figure 8A:
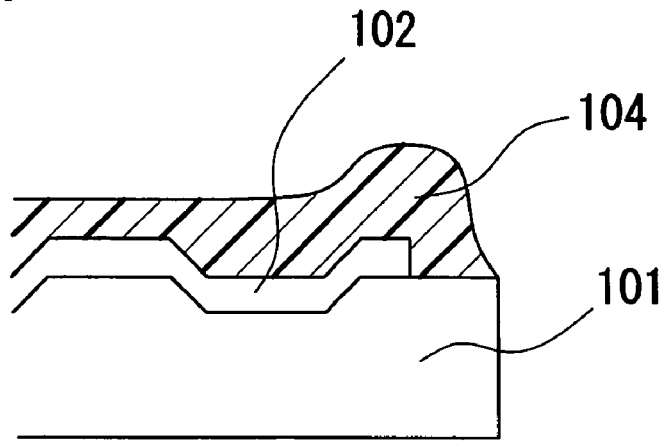
FIGS. 8A to 8C are diagrams each showing an optically transparent layer irregularly formed on the optical information recording medium.
Figure 8B:
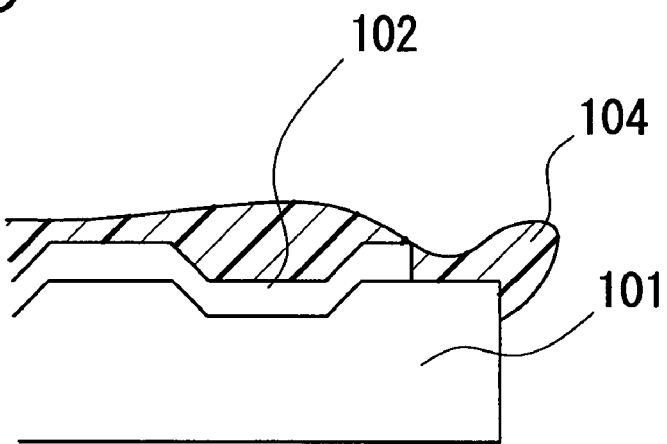
Figure 8C:
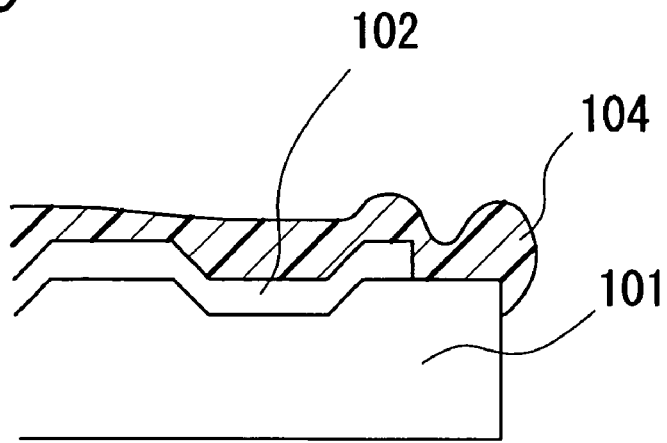

If the curing is carried out after the rotation of the substrate 101 is stopped, the optically transparent layer 104 can have a very large thickness at the outer end as shown in FIG. 8A. If the curing is carried out at a constant rotation speed, the resin can be extremely thin at a region near the outer end as shown in FIG. 8B. If the curing is carried out in the process of decreasing the number of revolutions of the substrate 101, the optically transparent layer 104 can be formed to have thin and thick portions at the same time as shown in FIG. 8C. In this embodiment, however, the curing is carried out during the acceleration of revolutions of the substrate 101 as described above, so that the thickness can be made uniform up to the vicinity of the outermost end. The acceleration is preferably changed depending on the viscosity of the radiation cure type resin 104, because a too high acceleration can increase variations in thickness.

Figure 4B:
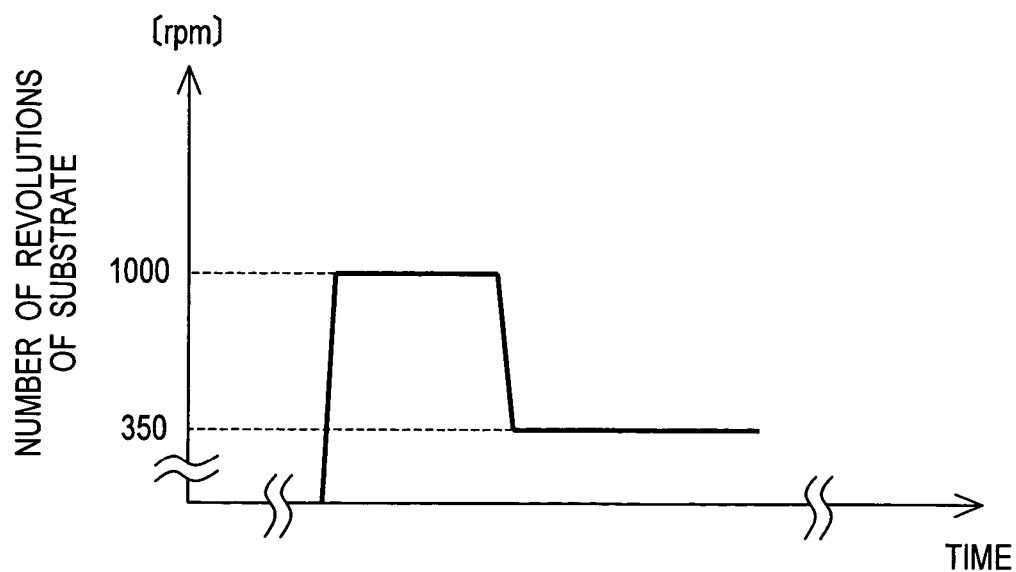

When the radiation cure type resin 104 is applied onto the substrate 101 by spinning, a part of the outer peripheral portion can not be coated with the resin 104 depending on the wettability of the signal recording layer 102 with the resin 104. In order to solve this problem, the time chart as shown in FIG. 4B may be used. According to the time chart, the number of application revolutions may be transiently made higher (for example, 1000 rpm) than the usual number (for example, about 350 rpm) in the step of resin application before the acceleration, and the high speed rotation may be maintained for a predetermined period (for example, about one second) when the radiation cure type resin 104 is applied over the surface of the signal recording layer 102. The number of application revolutions may then be returned to the original (for example, about 350 rpm).

Figure 9:
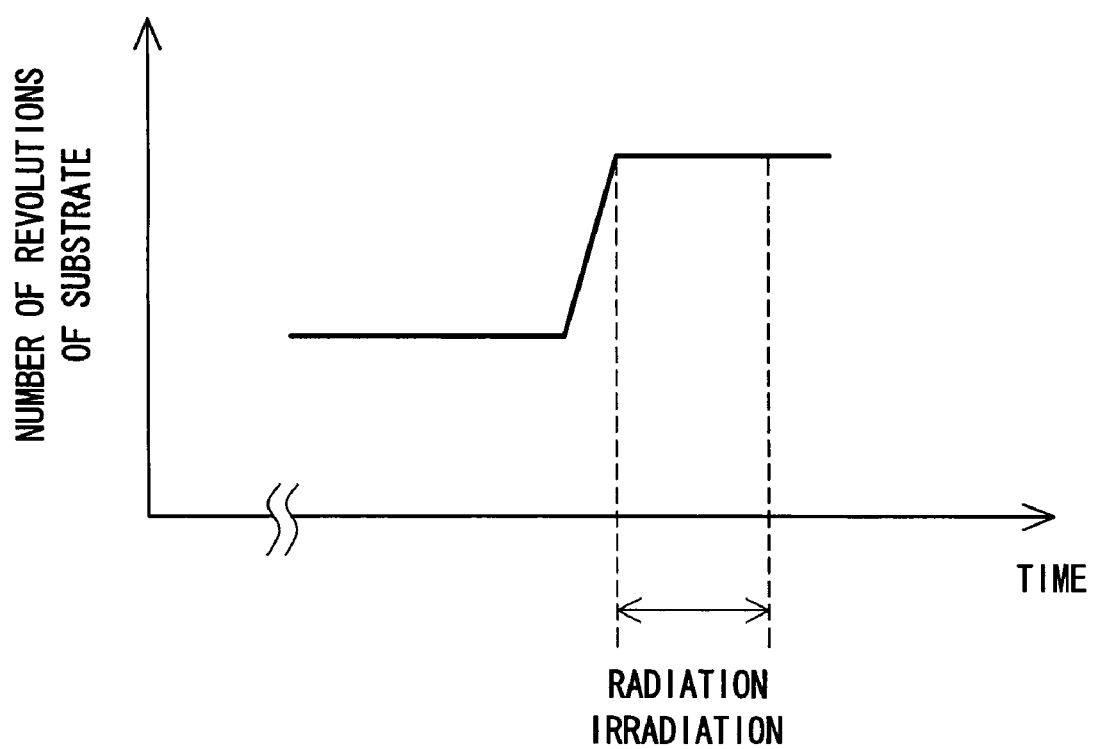
FIG. 9 is a diagram illustrating a timing of the radiation irradiation in the process of curing the radiation cure type rein after the acceleration of the rotation.

Alternatively, the curing of the resin may be performed after the acceleration (not during the acceleration). Specifically, the number of revolutions of the substrate 101 may be made higher than the number of application revolutions and then held at the higher number for a certain time period, and the curing may be performed immediately after such holding. As shown in FIG. 9, for example, the number of revolutions may be raised higher (for example, 1000 rpm) than the number of application revolutions, and the curing may be performed within a certain time period after the stop of the acceleration, for example, within about two seconds after the raise in the number of revolutions. Such a process can also bring about an effect substantially equivalent to that achieved during the acceleration.

The curing of the radiation cure type resin is preferably completed in a time as short as possible. In this embodiment, used is an apparatus that can apply pulses with high intensity from a xenon light source. If the curing takes much time, a difference in degree of spreading to the outer end can be made between the cured and uncured portions of the resin and the optically transparent layer can fail to have a uniform thickness, because the resin is cured while the substrate is rotated. Therefore, radiation is preferably irradiated with such intensity that the curing can be completed within one second.

In the process of irradiating the radiation, the radiation is preferably not irradiated to the outer end of the substrate or the detached (spun-off) radiation cure type resin, so that the spun-off resin can be recovered and subjected to a process such as filtration for reuse. In addition, the nozzle 113 is preferably moved away from the radiation so as not to be irradiated during the radiation irradiation.

Figure 10A:
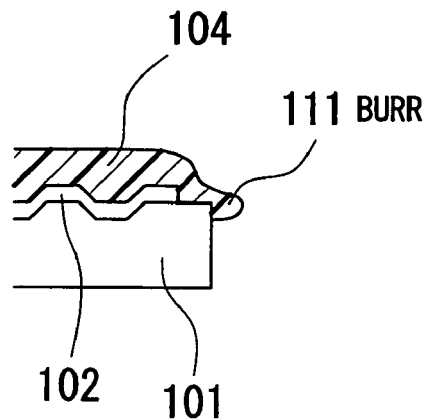
FIGS. 10A and 10B are diagrams illustrating burrs generated at the periphery of the substrate of the optical information recording medium.
Figure 10B:
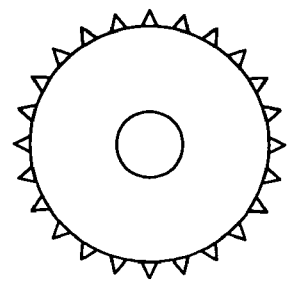
Figure 10C:
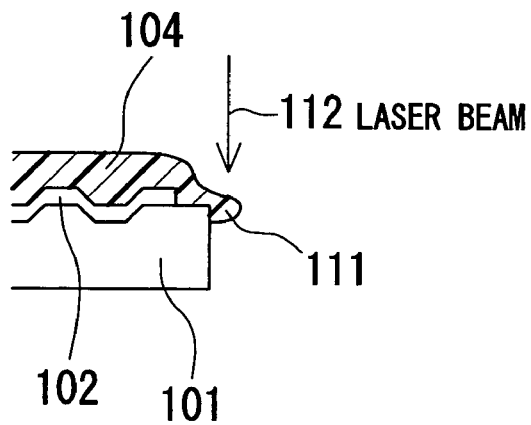
FIG. 10C is a diagram illustrating a method of removing burrs with a laser beam.
Figure 10D:
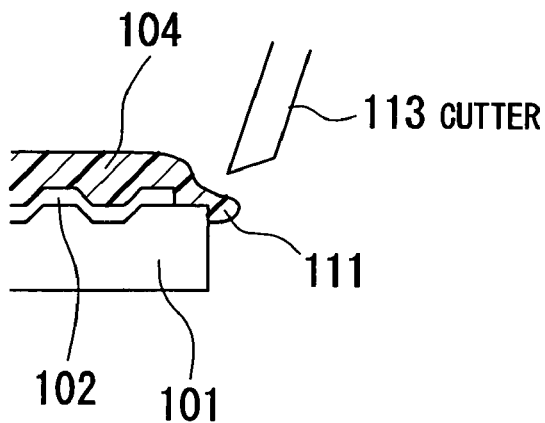
FIG. 10D is a diagram illustrating a method of removing burrs with a cutter.

If the radiation is irradiated or applied to the outer end face of the substrate 101, burrs can be generated as shown in FIGS. 10A and 10B. It is preferred that the burrs be removed, because they can cause a problem with appearance or mechanical characteristics such as deviance of center of mass. For example, as shown in FIG. 10C, the burrs may be cut off by irradiation of a laser beam 112, or as shown in FIG. 10D by means of a sharp metal or a cutting tool such as a cutter 113, or the burrs may be melted and removed by heat treatment. In addition, the curing at the outer end face may be inhibited by using a radiation cure type resin that is hard to cure in an atmosphere containing an excess amount of oxygen and placing the outer end portion in such an oxygen excess atmosphere in the process of radiation irradiation.

Figure 11A:
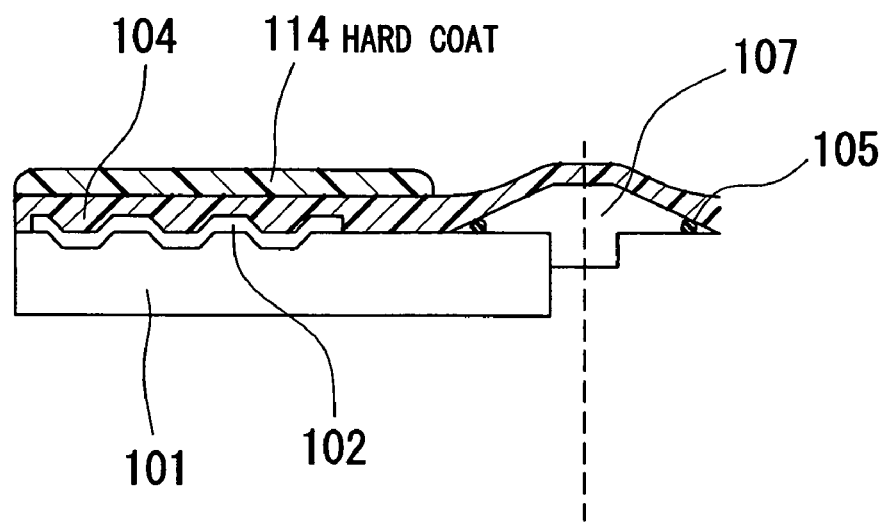
FIG. 11A is a diagram showing an optical information recording medium having a hard coat formed on the optically transparent layer.

Some types of radiation cure type resin can cause problems such as low hardness after the curing and easiness of receiving damage, high coefficient of friction and easiness of receiving damage, or easiness of receiving dusts. Against such problems, a hard coat 114 may be provided on the resin as shown in FIG. 11A.

Figure 11B:
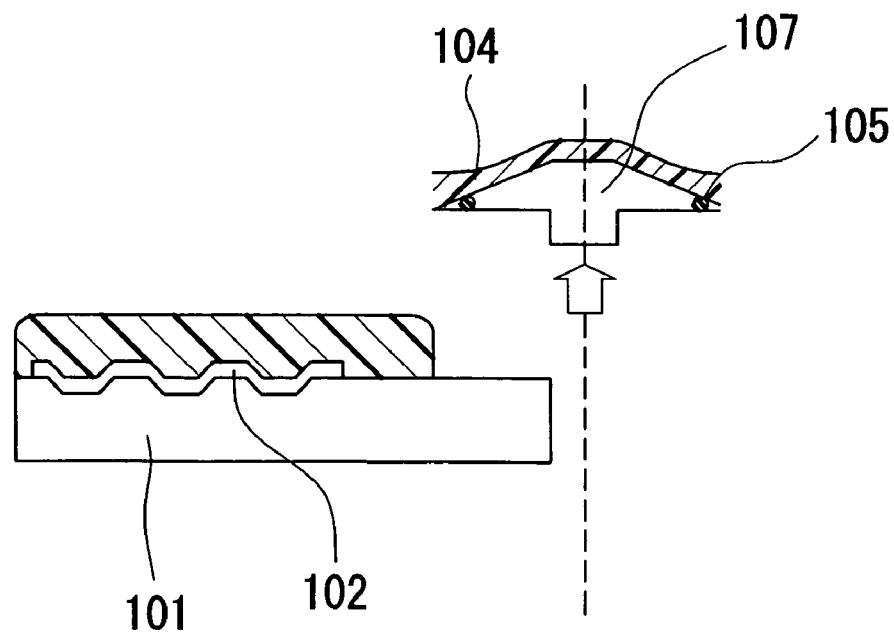
FIG. 11B is a diagram showing an optical information recording medium which is formed after the process of forming the optically transparent layer and then removing a cap.

Referring to FIG. 11B, the cap 107 is removed after the radiation curing. If the hard coat is provided, the cap 107 may be removed before or after the hard coating.

In this embodiment, a rewritable recording/reproducing type optical disk is provided as an example. Alternatively, may be provided a write-once type optical disk or a read-only type disk having a reflecting layer mainly composed of Al or Ag. A multilayer optical disk having two or more signal recording layers may also be provided.

Figure 12:
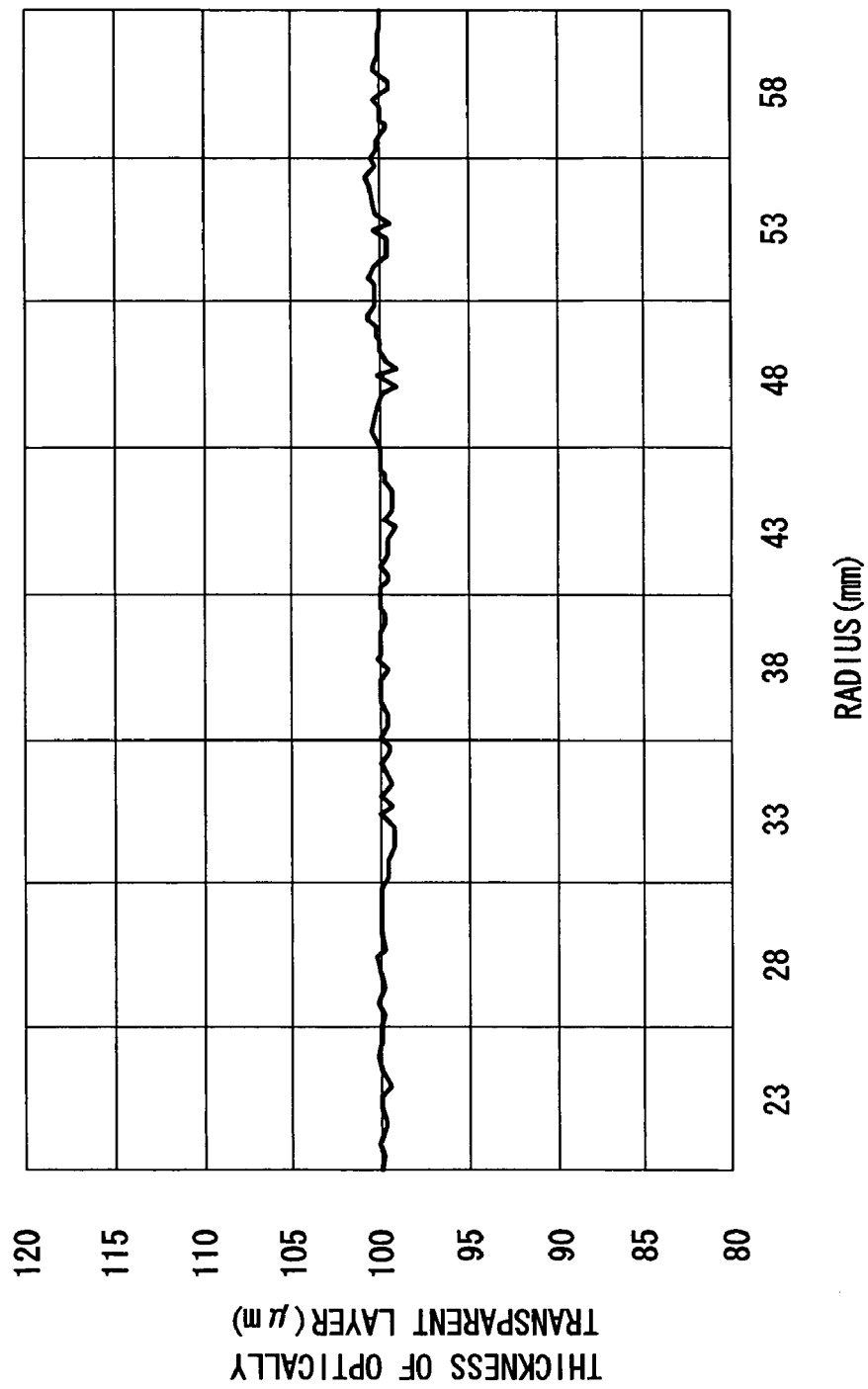
FIG. 12 is a diagram showing a radius-dependency of the thickness of the optically transparent layer in the optical information recording medium manufactured by the method according to the present invention.

FIG. 12 shows a radius-dependency of the thickness of the optically transparent layer in the optical information recording medium according to the embodiment of the invention. According to the method of the present invention, even distribution of thickness has been achieved in such a manner that variations in thickness defined by the peak to peak value are controlled to 2 µm or less per 100 µm thickness entirely ranging from the inner radius to the outer radius. The resulting high-density optical recording medium used with a blue laser has brought about a significant effect, that is, good reproduction characteristics from the innermost to the outermost (at a radius of 58.5 mm).

The above-described embodiment is not intended to limit the scope of the invention, and any other embodiments may also be provided based on the technical idea for the invention.

Second Embodiment

Figure 13A:
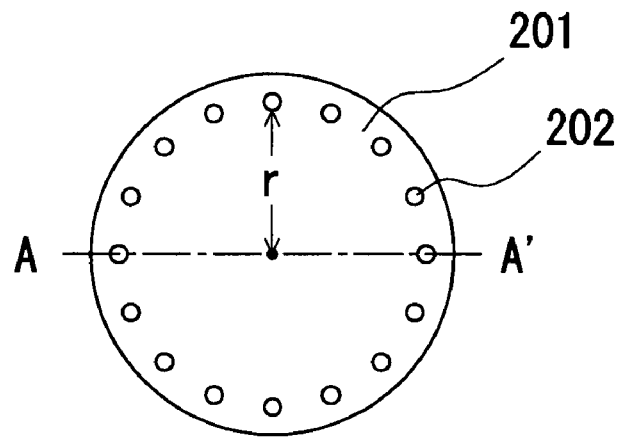
FIG. 13A is a top plan view showing a nozzle for supplying the radiation cure type resin onto the substrate according to the invention.
Figure 13B:
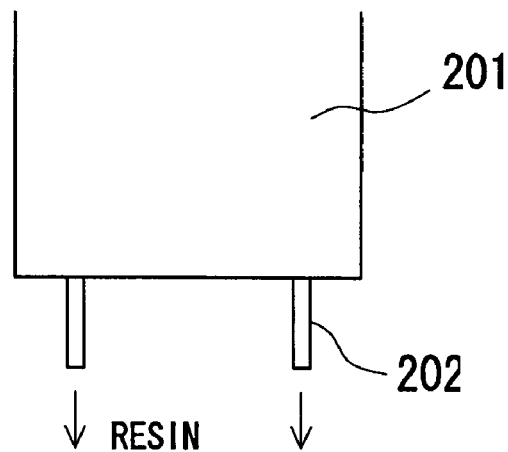
FIG. 13B is a sectional view (along A-A') showing the nozzle for supplying the radiation cure type resin onto the substrate according to the invention.
Figure 13C:
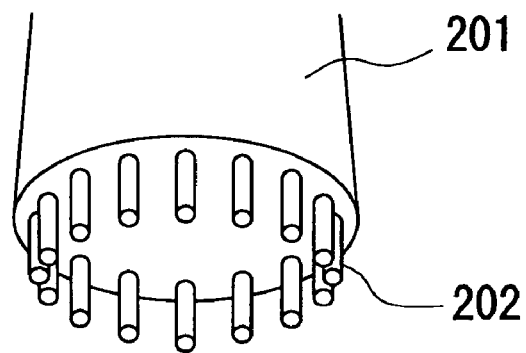
FIG. 13C is a perspective view showing the nozzle for supplying the radiation cure type resin onto the substrate according to the invention.

FIGS. 13A to 13C shows a nozzle for supplying the radiation cure type resin 104, which is used in this embodiment. FIG. 13A is a view of the bottom of the nozzle, FIG. 13B is a sectional view thereof, and FIG. 13C is a perspective view thereof. In this embodiment, the radiation cure type resin 104 is supplied using a nozzle 201 that has a plurality of openings 202 arranged at substantially the same radius as shown in FIGS. 13A to 13C. In the nozzle 201, eighteen openings 202 are provided at a radius of r (25 mm).

Similarly to First Embodiment, the substrate 101 is mounted on the rotary table 106. The nozzle 201 as shown in FIGS. 13A to 13C is used to supply the radiation cure type resin 104 onto portions located at substantially the same radius on the substrate 101. Such a nozzle 201 avoids the necessity for using the cap 107 of First Embodiment or the like. If the radiation cure type resin is supplied onto the cap 107 as in First Embodiment, problems of detachment and reuse of the cap 107 can appear after the curing of the resin. In contrast, such processes are unnecessary for this embodiment. For the purpose of making the thickness of the optically transparent layer uniform from the inner radius to the outer radius, the openings 202 of the nozzle 201 is preferably as near as possible to the central hole 105 of the substrate 101.

Figure 14A:
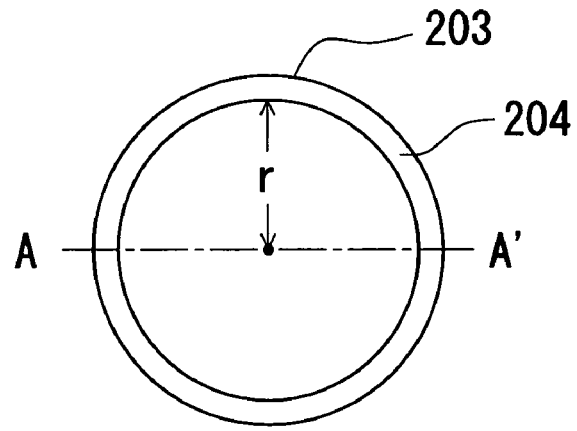
FIG. 14A is a top plan view showing another nozzle for supplying the radiation cure type resin onto the substrate according to the invention.
Figure 14B:
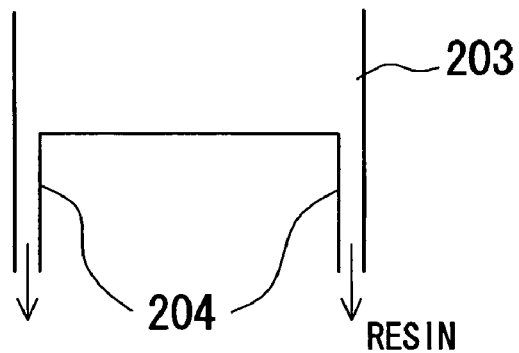
FIG. 14B is a sectional view (along A-A') showing the another nozzle for supplying the radiation cure type resin onto the substrate according to the invention.
Figure 14C:
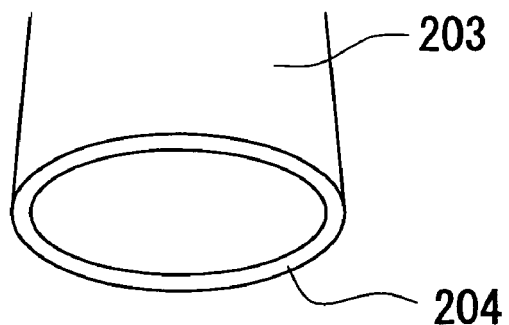
FIG. 14C is a perspective view showing the another nozzle for supplying the radiation cure type resin onto the substrate according to the invention.

FIGS. 14A to 14C show another example of the nozzle. FIG. 14A is a view of the bottom of the nozzle, FIG. 14B is a sectional view thereof, and FIG. 14C is a perspective view thereof. Referring to the drawings, the nozzle 203 has a ring-shaped opening 204 for ejecting the resin. The nozzle 203 can bring about a similar effect.

If the radiation cure type resin 104 has such a viscosity or the like that the central hole of the substrate can be stained with the resin 104, the nozzle of this embodiment may be used in combination with the cap 107 of First Embodiment. Alternatively, air may be blown from the side of the central hole 105 of the substrate 101 to the outer radius side to prevent the radiation cure type resin 104 from penetrating.

The steps of First Embodiment are used after the step of supplying the resin from the nozzle.

Third Embodiment

In First and Second Embodiments, the application of the radiation cure type resin 104 and the curing by the radiation irradiation are performed in the same place. In such a process, however, the spun-off radiation cure type resin can be cured while adhering to the units such as the rotary table 106 and cause some trouble with the operation of the rotary table 106. If some mechanism is provided to prevent such trouble, the apparatus can be complicated.

In this embodiment, therefore, the supplying/application of the radiation cure type resin 104 and the curing by the radiation irradiation are independently performed in different places.

Figure 15:
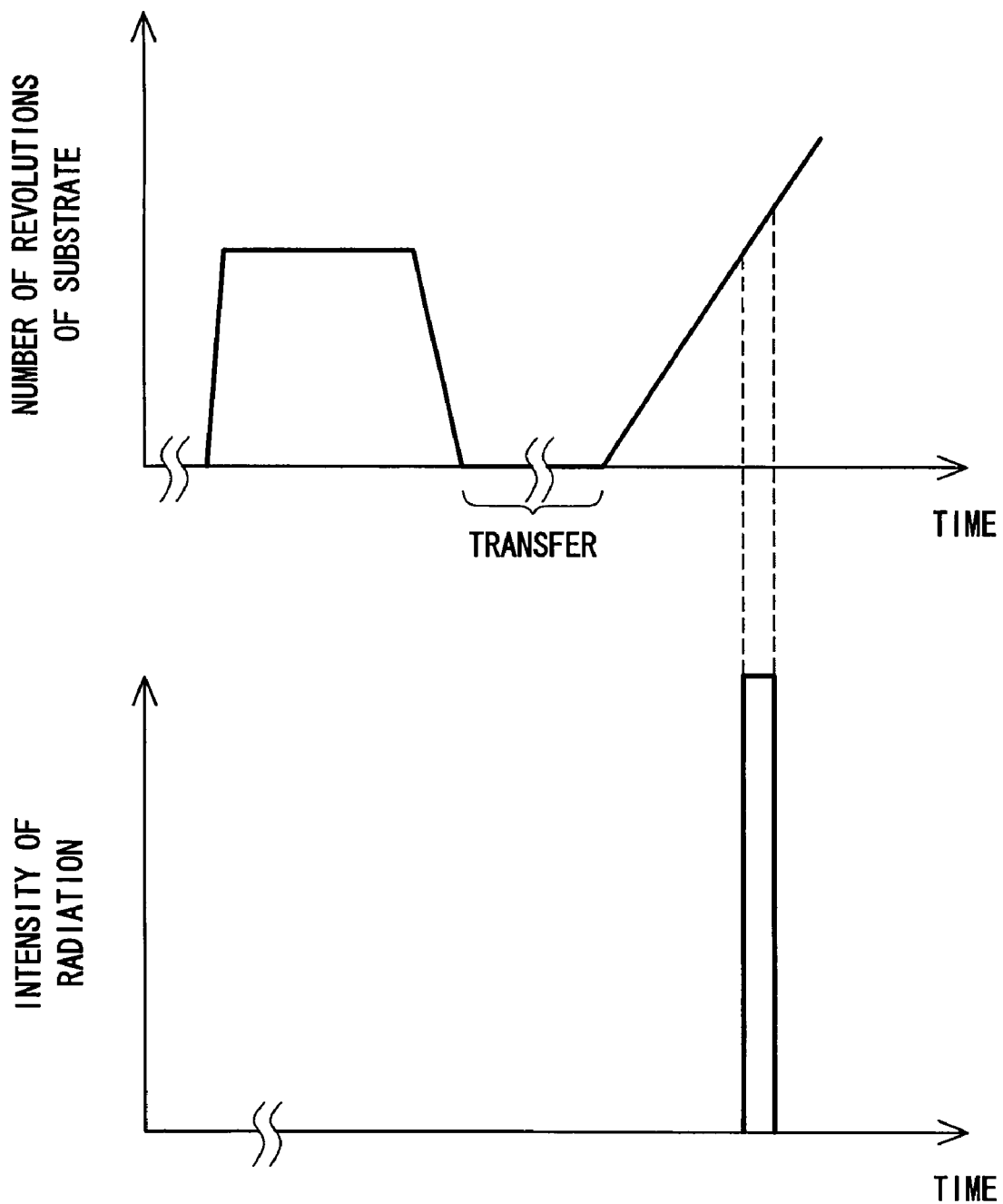
FIG. 15 is a time chart for the method of manufacturing the optical information recording medium, in which processes of supplying, applying, and curing the resin are independently performed in different places.

For example, at the time when application of the radiation cure type resin is made to some extent, the substrate 101 is stopped from rotating and then transferred to another place for radiation irradiation. At the another place, radiation is irradiated while the rotation of the substrate is accelerated, for example, at 100 rpm/s. FIG. 15 shows a time chart in such a case. The process of applying and curing the radiation cure type resin 104 in different places can reduce the amount of the spun-off and cured resin. It can also be easy to provide a mechanism for reducing the amount of the spun-off radiation cure type resin.

Figure 16:
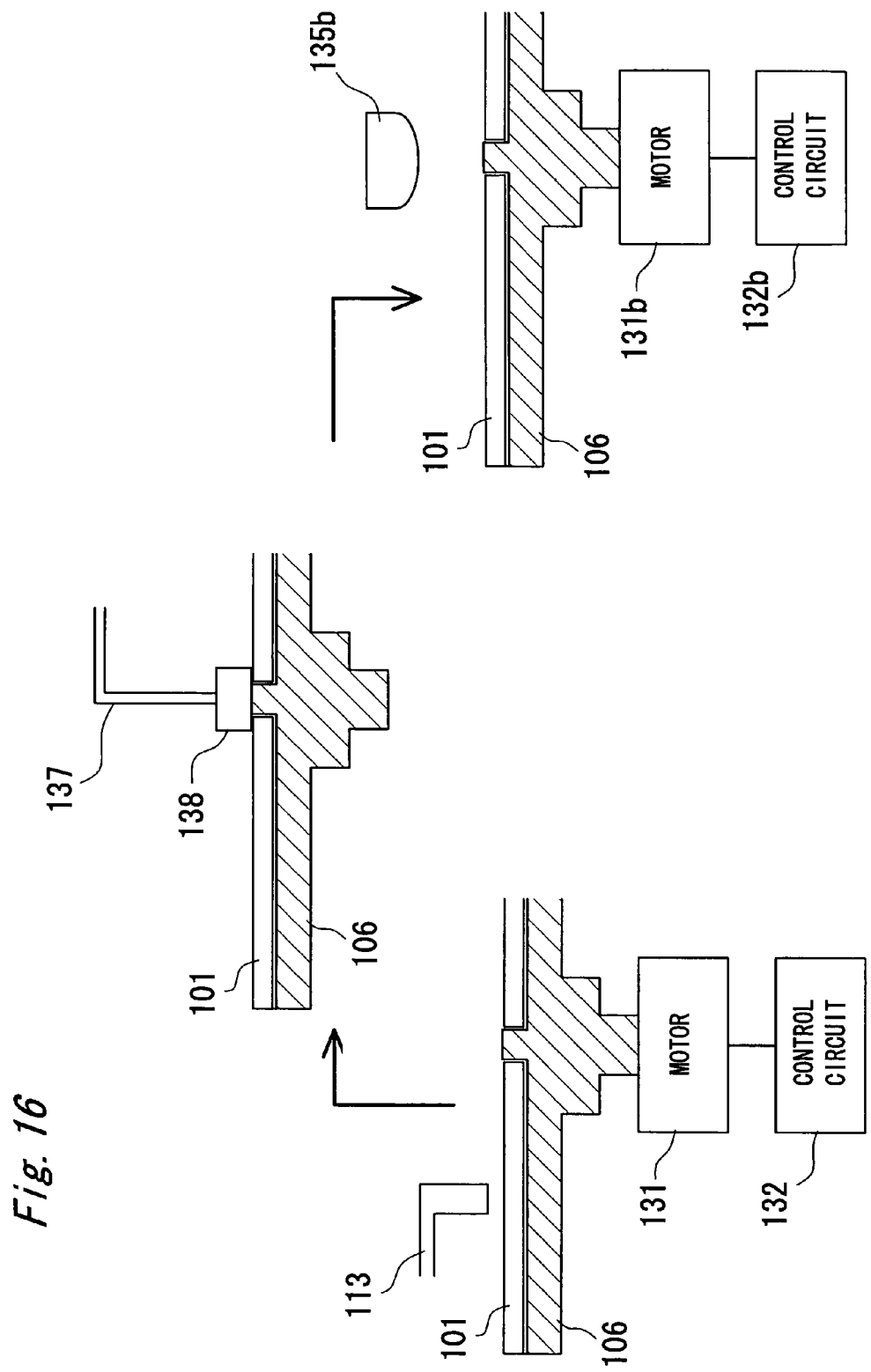
FIG. 16 is a diagram showing a configuration of an apparatus for carrying out the method of manufacturing the optical information recording medium, in which the processes of supplying, applying, and curing the resin are independently performed in different places.

FIG. 16 shows a configuration of an apparatus for carrying out the above process. As shown in the drawing, the apparatus includes a rotary table 106 made of metal and transfer means 137 having a magnet 138 at its tip. The table 106 and the substrate 101 are lifted together by the transfer means 137 and separated from the motor 131 which is placed where the resin is supplied and applied, and then transported to another place for resin curing and placed on a motor 131b in the another place. Such a configuration can raise the recycle ratio of the radiation cure type rein, so that the manufacturing cost can be reduced. In addition, each step is independently carried out, and therefore, the manufacturing apparatus can easily be built.

As described above, the substrate 101 may be once stopped from rotating and then rotated again. Even through such a process, the optically transparent layer can be formed uniformly up to the outer end by the process of irradiating radiation to cure the resin during the acceleration, similarly to First Embodiment. The optically transparent layer can uniformly be formed over the entire surface of the signal recording layer.

Figure 17:
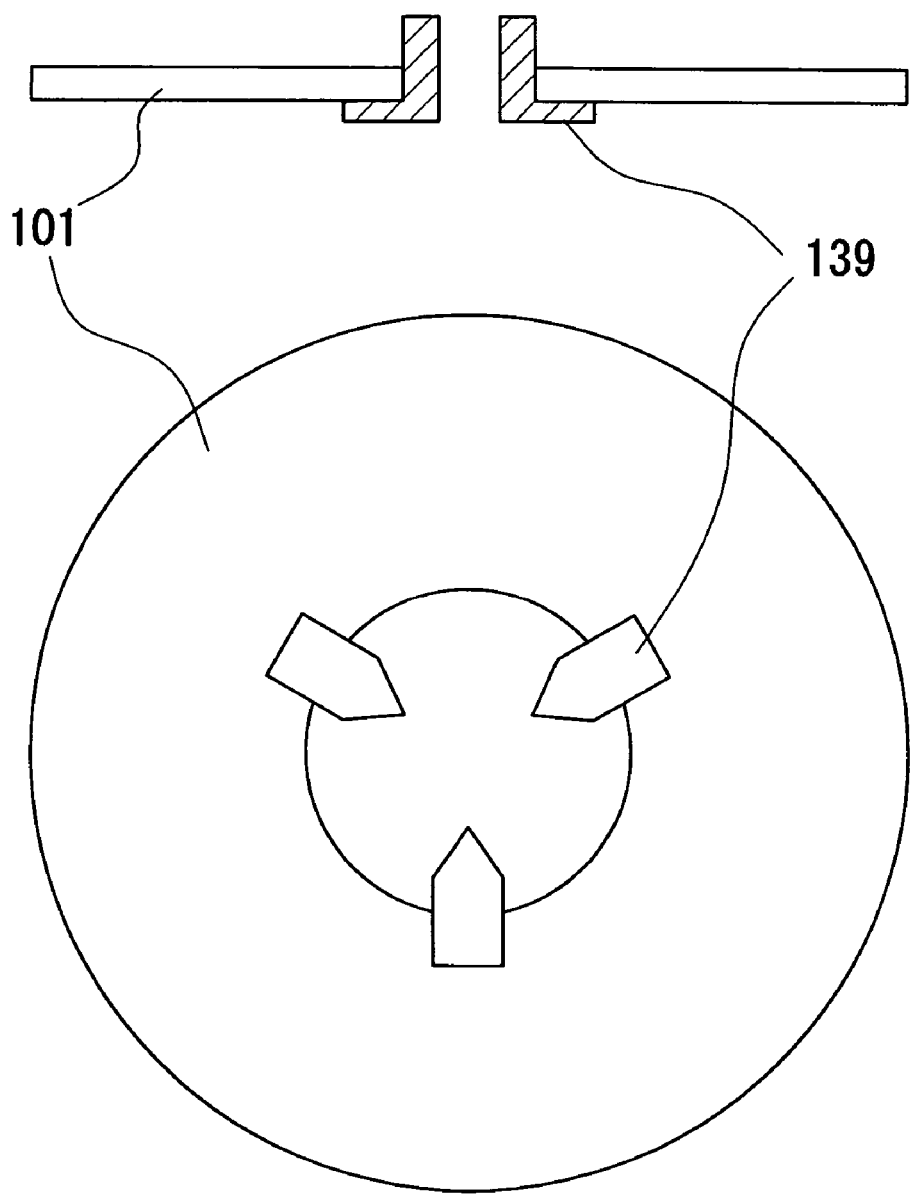
FIG. 17 is a diagram illustrating a mechanism for holding the optical information recording medium to be transferred.

In the example as shown in FIG. 16, the table 106 and the substrate 101 mounted thereon are transferred to another place. Alternatively, only the substrate 101 may be moved to another place. For example, such transfer can be made using a three-claw pin 139 as shown in FIG. 17 in place of the above magnet 138. The substrate 101 can be held at a center portion thereof by the pin 139 and lifted.

Fourth Embodiment

The description below is about the fourth embodiment of the inventive method of manufacturing the optical information recording medium.

In First Embodiment, the cap 107 is detached after the radiation cure type resin 104 is cured. However, the following problems can be caused in this case. The radiation-cured resin on the signal recording layer 102 can be cracked in the step of detaching the cap 107, depending on the hardness and the thickness of the radiation-cured resin. The portion from which the cap 107 is detached can have burrs or the like, which can affect the holding of the optical information recording medium at the time of recording or reproducing.

In this embodiment, therefore, the cap 107 is detached before the radiation irradiation, and then radiation is applied to cure the radiation cure type resin on the substrate 101. The cap 107 can be reused if it is subjected to a cleaning process. The cap 107 is preferably removed so that the cap 107 is not irradiated by the radiation.

Thus, the cap 107 can be reused any number of times, and a uniform optically transparent layer can be formed with no adverse effect on the resin 104 on the signal recording layer 102.

According to the method of manufacturing the optical information recording medium in First to Fourth Embodiments, the optically transparent layer can be formed uniformly over the signal region of the substrate, though such a uniform optically transparent layer has been difficult to form by conventional spin coating methods. Specifically, the problem of a projection at the outer end of the optically transparent layer and the problem of a thinner part at the inner radius can be solved, so that the medium can easily be produced.

Fifth Embodiment

Figure 18:
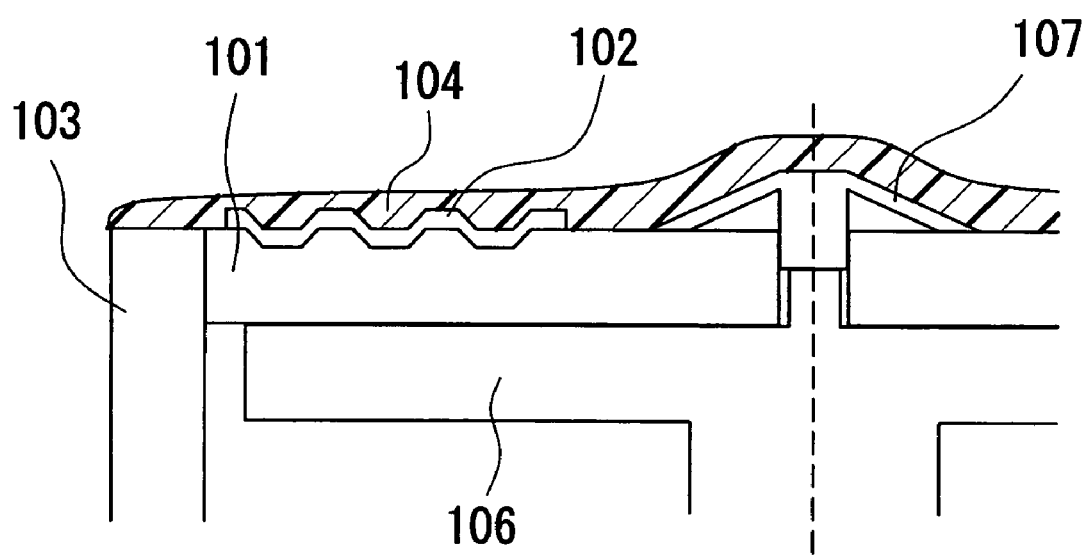
FIG. 18 is a diagram illustrating a system for suppressing the generation of burrs at the outer end of the substrate.

In this embodiment, described is a method of manufacturing the optical information recording medium which can prevent burrs from being generated at the outer end of the optical information recording medium. FIG. 18 is a diagram (a section viewed from a side) showing a member for removing burrs, which is placed at the outer end of the optical information recording medium. Referring to the drawing, a member 103 for removing the resin protruding from the outer end of the optical information recording medium (a removing member) is provided at the outer end of the optical information recording medium. Burrs generated at the outer end of the optical information recording medium can be removed using the member 103.

Figure 19A:
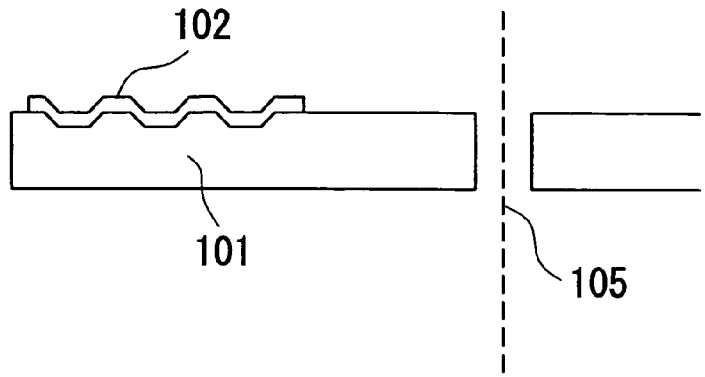
FIGS. 19A to 19C are diagrams for illustrating a method of manufacturing the optical information recording medium, in which the generation of burrs can be suppressed.
Figure 19B:
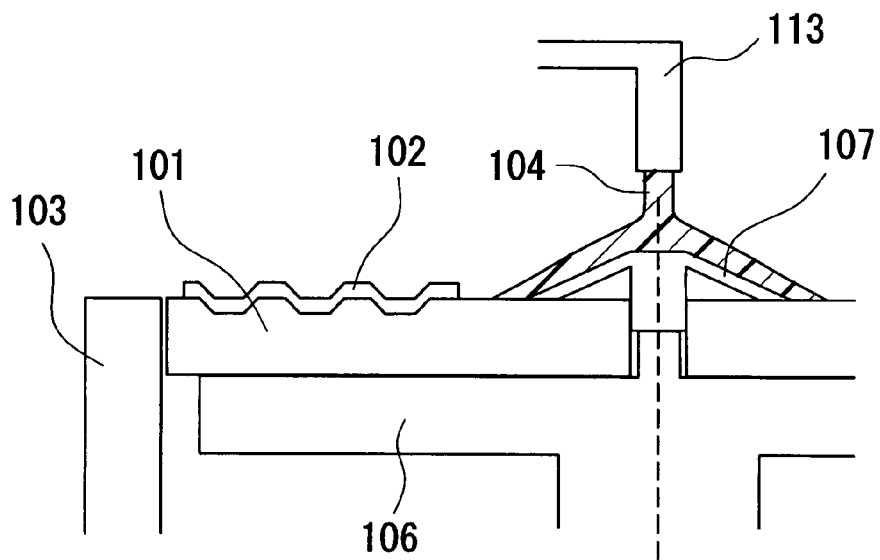

One example of a method of manufacturing the optical information recording medium according to the invention is shown below. The substrate 101 having the signal recording layer 102, a thickness of 1.1 mm, a diameter of 120 mm, and a central hole 105 with a diameter of 15 mm, as shown in FIG. 19A, is placed on the rotary table 106 with the central hole 105 blocked by the cap 107, as shown in FIG. 19B. The cap 107 is made of metal and has a conical outer shape. The inside of the cap 107 has a doughnut-shaped hollow structure so that only the outermost of the cap 107 is in line-contact with the substrate 101. The cap 107 may be coated with Teflon® so that adhesion of the radiation cure type resin can be prevented.

While the substrate 101 is stopped or rotated at a low speed of 120 rpm or less, the radiation cure type resin 104 is added supplied onto substantially the center of the cap 107 from the nozzle 113. The radiation cure type resin 104 has a viscosity of about 500 mPa·s at room temperature and is supplied at a rate of about 1 cm$^3$/s. The viscosity of the radiation cure type resin 104 and the supplying rate are each preferably changed depending on the thickness of the optically transparent layer to be formed.

If the radiation cure type resin 104 is supplied as near as possible to the center, the thickness of the optically transparent layer formed on the signal recording layer 102 can easily become uniform ranging from the inner radius to the outer radius. In this embodiment, the central hole 105 is blocked with the cap 107, and the radiation cure type resin 104 is supplied onto the cap 107, so that the effect can be maximal. The cap used here has a diameter of 23 mm.

As shown in FIG. 19B, the cap 107 has such a doughnut-shaped hollow structure that only its outermost is in line-contact with the substrate 101. The cap 107 having such a structure can prevent the radiation cure type resin from penetrating to the contact surface between the cap 107 and the substrate 101 due to capillary action. Such an effect can be enhanced by providing a mechanism of pulling the cap 107 downward, specifically by providing, at the center of the rotary table 106, a suction hole for pulling the center of the cap 107 downward as shown in FIG. 5. Alternatively, the cap may have a structure as shown in each of FIGS. 6A to 6C.

For example, a nozzle as shown in FIGS. 13A to 13C or FIGS. 14A to 14C may be used to supply the radiation cure type resin 104 in a circular form onto the vicinity of the central hole of the substrate, and then the resin may be spread, so that a uniform layer can be formed. In such a case, there is no need to use the cap 107.

Figure 19C:
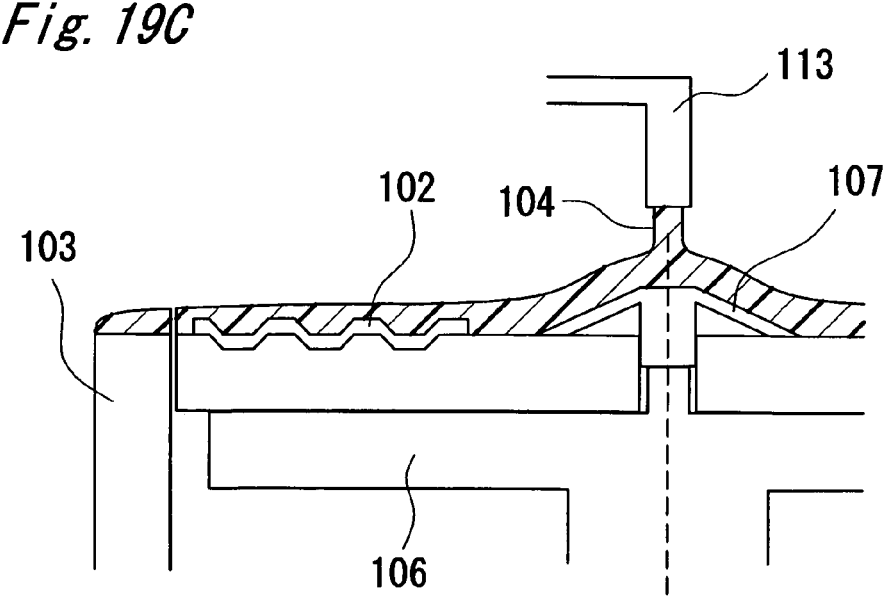

Referring to FIG. 19C, while the radiation cure type resin 104 is supplied, the substrate 101 is rotated at about 350 rpm about three seconds after the start of the supplying, so that the radiation cure type resin 104 is applied onto the signal recording layer and made even.

The supplying of the radiation cure type resin 104 is stopped about 10 seconds after the start of the 350 rpm rotation. The supplying may be stopped rapidly or the supplying amount may be gradually decreased. If the supplying is maintained for a while during the rotation, the feed of the radiation cure type resin 104 can be balanced with the amount of the resin dissipated by spreading, so that uniform application of the radiation cure type resin 104 can be easy.

In such a balanced state, however, the thickness at the inner radius tends to be slightly greater than that at the outer radius. After the stop of the supplying of the radiation cure type resin 104, therefore, the spreading of the resin 104 is continued for about 15 seconds while the substrate 101 is held rotated. The rotation of the substrate is then accelerated at about 100 rpm/s. Referring to FIG. 7, when the number of revolutions of the substrate reaches about 600 rpm, radiation 110 is irradiated to cure the radiation cure type resin 104 while the substrate is accelerated, so that the optically transparent layer 115 is formed. By such a process, the optically transparent layer can be formed uniformly up to the vicinity of the outer end of the substrate. After the radiation cure type resin is cured, the rotation of the substrate is stopped. The time chart for the above entire process is as shown in FIG. 4A.

Particularly in this embodiment, the member 103 is brought into contact with the outer end of the substrate 101 while the rotary table 106 is rotated, in the process of curing the radiation cure type resin 104 (see FIG. 18). In such a process, the radiation cure type resin 104 is spread to the member 103 and scraped off, so that a uniform optically transparent layer can be formed without generating burrs at the outer end of the substrate 101. In such a process, the member 103 may be placed so as to be substantially in contact with the substrate 101 before the radiation cure type resin 104 is supplied. Alternatively, the member 103 may be placed so as to be substantially in contact with the substrate 101 after the radiation cure type resin 104 is supplied and immediately before the radiation 110 is irradiated.

In this embodiment, the member 103 is made of metal. Alternatively, the member 103 may be made of a resin material such as polyurethane and polyacetal, for the purpose of preventing the possibility of damage to the substrate 101. The material soluble in the radiation cure type resin 104 is preferably avoided.

Figure 20A:
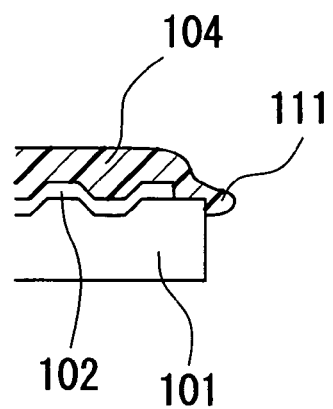
FIGS. 20A to 20C are diagrams illustrating burrs generated at the periphery of the optical information recording medium.
Figure 20B:
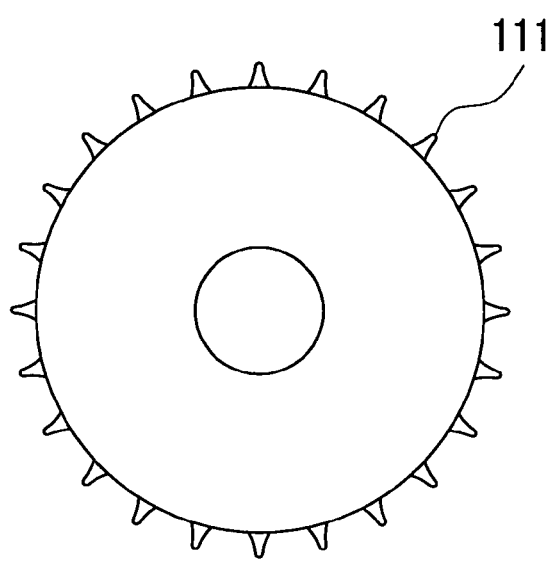

If the member 103 is not used in the process of irradiating radiation to cure the radiation cure type resin on the substrate being rotated, the burrs 111 can be generated as shown in FIGS. 20A and 20B to cause a problem with appearance and a problem with mechanical characteristics such as deviance of center of mass.

The member 103 placed at the outer end scrapes the unnecessary radiation cure type resin, which would otherwise cause burrs at the outer end. Semi-cured burrs generated after the radiation irradiation are also scraped and removed by the member 103. The burrs are eliminated by the member 103 mainly through these two processes.

Preferably, the level of the top face of the member 103 is substantially equal to or higher than that of the surface of the substrate 101 having the signal recording layer 102. If the level is too low, burrs are generated as shown in FIGS. 20A and 20B similarly to the case where the member 103 is not provided.

Figure 20C:
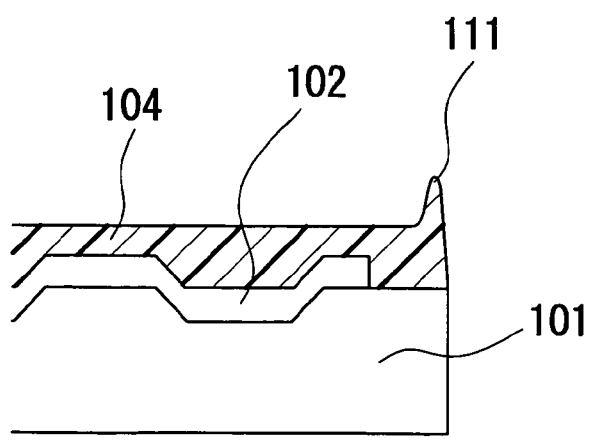

If the top face of the member 103 is placed higher than the signal recording layer 102, a burr 111 projecting upward as shown in FIG. 20C can be generated when the member 103 is located so as to be in contact with the substrate 101. A burr 111 can be prevented by keeping a little distance (about 1 mm in this embodiment) between the substrate and the member. If the rotation of the substrate 101 is not center-symmetrical (with eccentricity), it will be difficult to maintain a constant distance between the substrate 101 and the member 103. In order to keep a certain distance between the substrate and the member, a projection is preferably provided at the rotation center of the surface of the rotary table 106 so as to fit into the central hole of the substrate 101. Such a structure can easily reduce the eccentricity to 100 μm or less.

In the case that the burrs are prevented by the member 103 which is in contact with the substrate 101 and whose top level is substantially equal to that of the surface of the substrate 101 having the signal recording layer 102, the member may be pressed to the substrate by applying a certain pressure. If the pressure is too high, it can affect the rotation of the substrate 101. Therefore, the pressure is preferably as low as possible unless the contact is broken. For example, the pressure is preferably from $10^{-4}$ to 1 N/m$^2$, particularly preferably from $10^{-4}$ to $10^{-2}$ N/m$^2$.

Figure 21A:
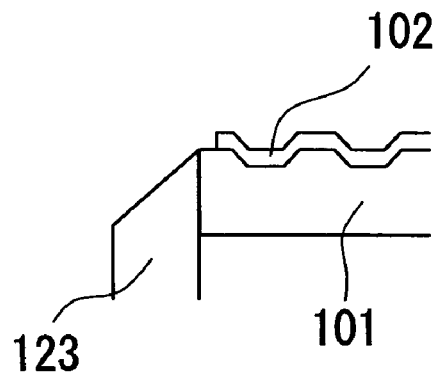
FIGS. 21A and 21B are diagrams each showing the shape of a member for removing burrs generated at the outer end (a burr-removing member).
Figure 21B:
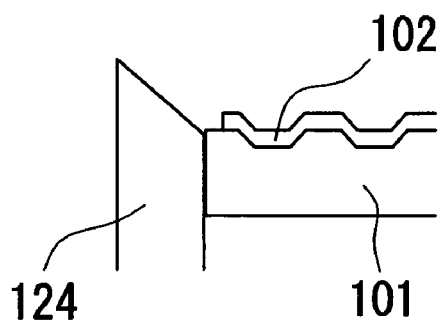
Figure 21C:
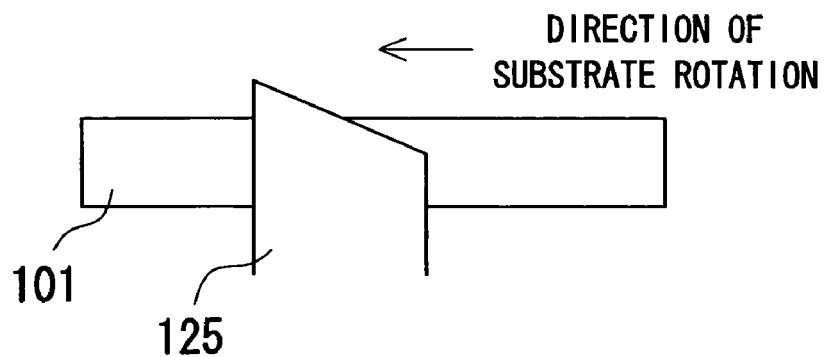
FIG. 21C is a diagram showing the shape of a burr-removing member viewed from the outer end to the center of the substrate.

The top face of the member 103 may not be parallel to the surface of the substrate 101 having the signal recording layer 102. For example, as shown in FIG. 21A or 21B, a member 123 or 124 may be provided whose top face is inclined toward the outer side, or as shown in FIG. 21C (viewed from the outer side to the center of the substrate 101), a member 125 may have such a shape that the top face is inclined toward the direction of rotation. The angle and the shape of the burr may vary depending on the viscosity of the radiation cure type resin 104 and the number of revolutions. Therefore, it is preferred that an optimal member is selected depending on such situations.

Figure 22A:
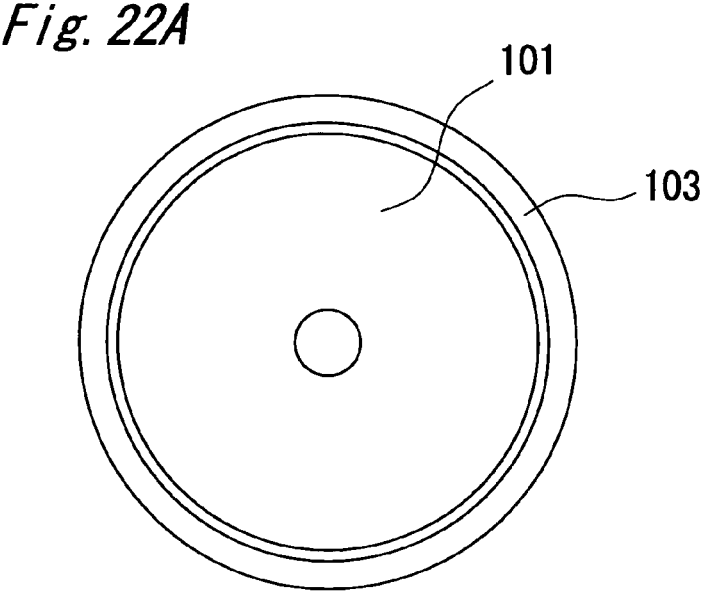
FIG. 22A is a top plan view showing a burr-removing member in the shape of a circular cylinder.
Figure 22B:
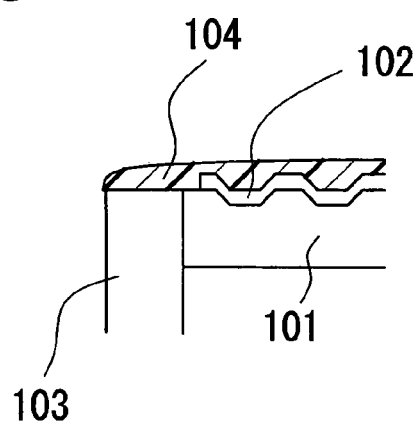
FIG. 22B is a sectional view showing a burr-removing member in a rectangular shape placed adjacent to the substrate.
Figure 22C:
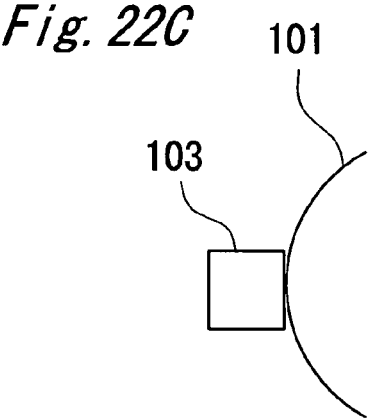
FIG. 22C is a top plan view showing the burr-removing member in the rectangular shape placed adjacent to the substrate.
Figure 22D:
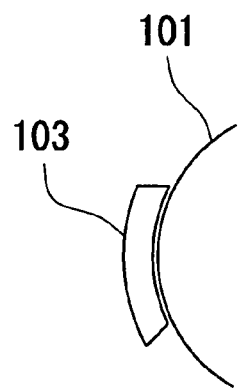
FIG. 22D is a sectional view showing a burr-removing member in an arc shape placed adjacent to the substrate.

Referring to FIG. 22A, the member 103 may be a circular cylinder so as to have the substrate 101 inside. Alternatively, as shown in FIG. 22B or 22C, the member 103 may have a rectangular shape. The member 103 may also have a shape along the periphery of the substrate 101 (for example, a member 122 in an arc shape as shown in FIG. 22D). Although in this embodiment, the member is placed at a single position, such a member may be placed at different positions, respectively.

It is preferred that the member or the spun-off radiation cure type resin 104 is not irradiated in the process of applying radiation 110. Thus, the spun-off radiation cure type resin 104 can be recovered and subjected to a process such as filtration, so that the resin 104 can be reused. Further it can prevent deterioration of periphery burr-removing effect which is caused by the radiation cure type resin 104 adhering to the member 103 and curing to deform the member 103.

Figure 23A:
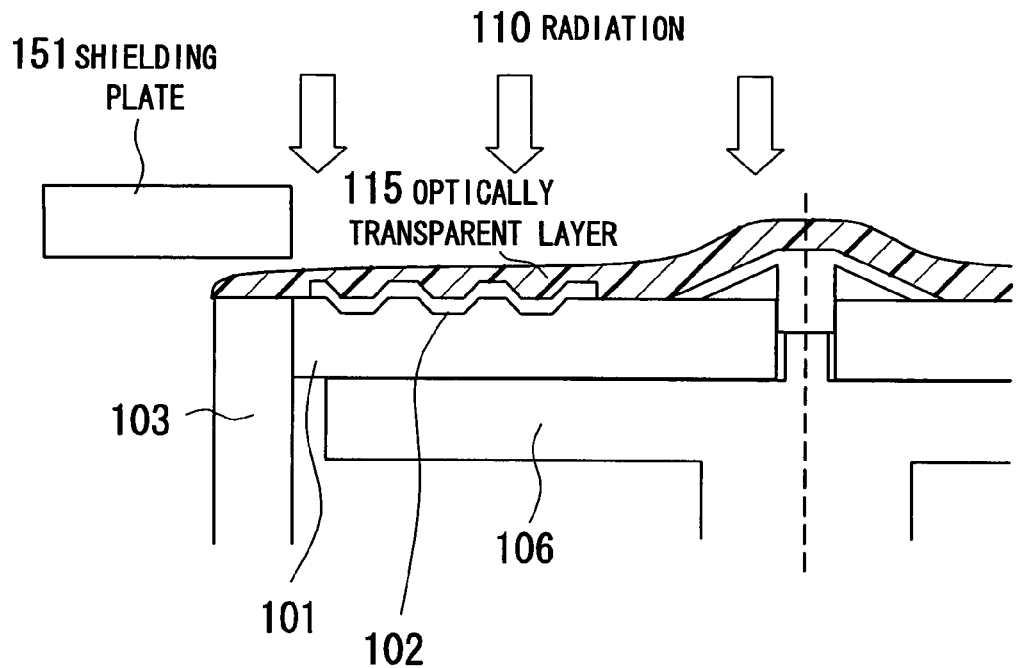
FIG. 23A is a diagram illustrating a configuration in which a shielding plate is placed above the burr-removing member when the resin is cured.
Figure 23B:
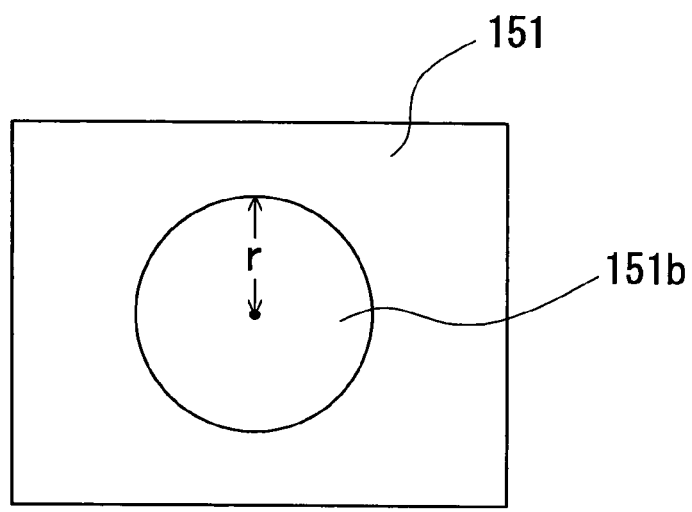
FIG. 23B is a diagram showing the shielding plate.

Thus, a shielding plate 151 as shown in FIG. 23B is preferably used so that the radiation cure type resin 104 can be cured only on the substrate 101 as shown in FIG. 23A. In this embodiment, the shielding plate 151 which has a hole 151*b* with a radius of r substantially equal to that of the substrate 101, is placed as shown in FIG. 23A so that radiation 110 is irradiated only to the substrate 101.

A radiation cure type resin 104 that is difficult to cure in an atmosphere containing an excess amount of oxygen may also be used. If such a resin is used and the member 103 is placed in such an oxygen excess atmosphere in the process of applying radiation, the resin 104 adhering to the member 103 can effectively be prevented from being cured.

Figure 24A:
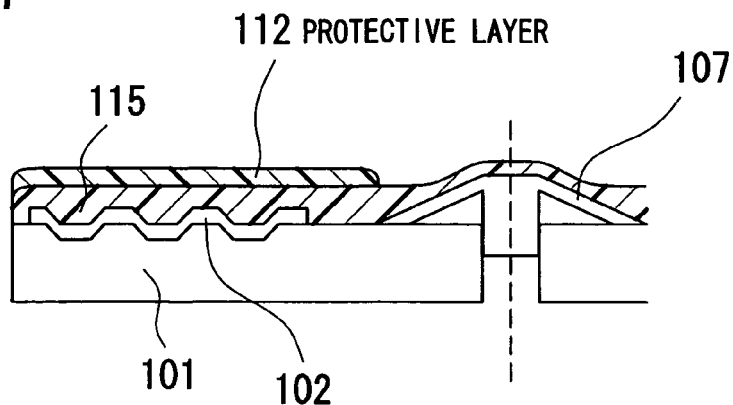
FIG. 24A is a diagram for illustrating a manufacturing process of an information recording medium having a protective layer formed on the optically transparent layer.

Some types of radiation cure type resin can cause problems such as I easiness of receiving damage by low hardness after the curing or high coefficient of friction, or easiness of receiving dusts. Against such problems, a protective layer 112 may be formed on the optically transparent layer 115 as shown in FIG. 24A. In this embodiment, the protective layer 112 is formed with a thickness of about 3 μm by a conventional spin coating method. Alternatively, the protective layer 112 may be formed by the inventive method for forming the optically transparent layer.

In addition, the material for the protective layer may have the function of preventing the optically transparent layer from absorbing moisture or the like. Such a protective layer can prevent the optically transparent layer from suffering moisture damage or from expanding by moisture absorption. For example, a dielectric film or the like formed with a thickness of about 3 nm to about 50 nm by sputtering or the like can bring about such an effect.

The protective layer may be composed of different layers of different materials so as to have the different functions as described above.

Figure 24B:
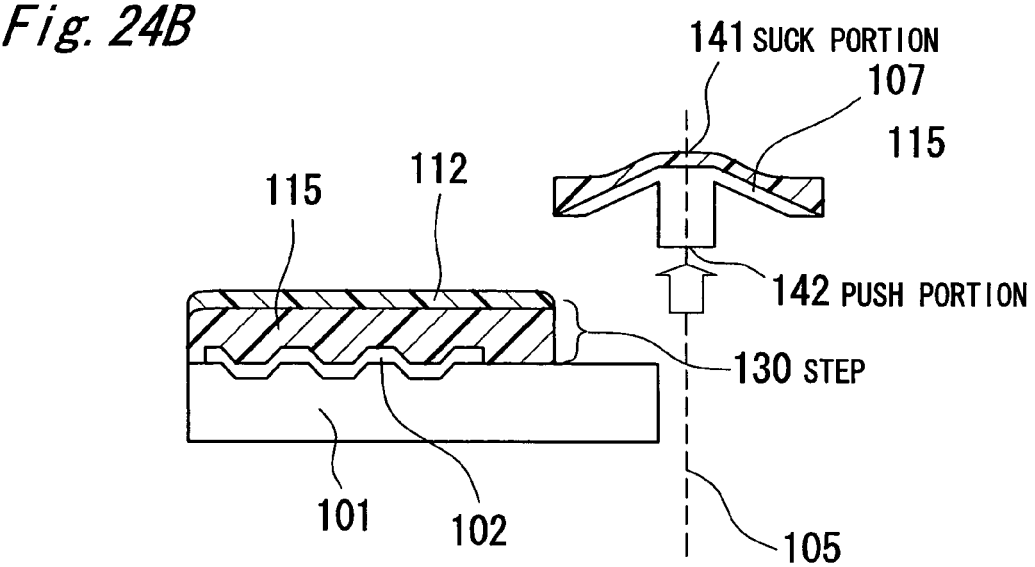
FIG. 24B is a diagram showing a structure of the information recording medium obtained after the process of forming the protective layer on the optically transparent layer and then removing a cap.

The process of this embodiment includes the steps of: masking the central hole 105 with the cap 107 when the optically transparent layer is formed; and removing the cap 107 after the optically transparent layer is formed. If the protective 112 layer is formed, however, the cap may be removed at any time before or after the protective layer is formed. Referring to FIG. 24B, the cap 107 can easily be detached by sucking a suck portion 141 and pressing a push portion 142 upward. Referring to FIG. 24B, the optically transparent layer forms a step 130 at the inner radius region of the substrate 101 after the cap 107 is removed. Therefore, the diameter of the cap 107 is preferably so selected that such a step is not located in the region (the clamp region) that is supported in the process of reading or writing into the optical disk.

After detached, the cap 107 may be subjected to a process such as cleaning for removing the adhering radiation cure type resin and then reused.

According to this embodiment, the optically transparent layer can be formed with a thickness of about 100 μm, and variations in thickness of the optically transparent layer on the signal recording layer 102 can be controlled to 3 μm or less. Thus, even under the conditions of an NA of about 0.85 and a laser beam wavelength of about 400 nm, recording and reproducing can be made in good quality, and a tilt margin equivalent to that for DVD can be ensured.

Figure 24C:
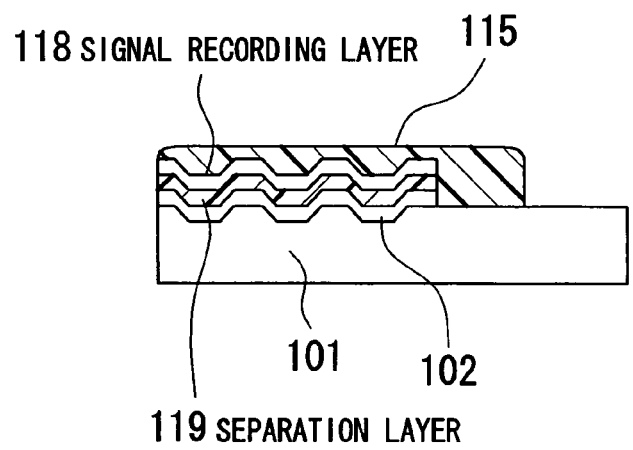
FIG. 24C is a diagram showing an optical information recording medium having a plurality of signal recording layers.

The signal recording layer 102 may be any of a rewritable type, a write-once type, and a read-only type having a reflecting layer mainly composed of Al or Ag. As shown in FIG. 24C, a multilayer optical disk having a plurality (two or more) of signal recording layers may also be provided. Referring to FIG. 24C, a separation layer 119 is provided to separate two signal recording layers 102 and 118. In terms of recording/reproducing characteristics, the separation layer 119 preferably has a thickness of about 30 μm.

Sixth Embodiment

Figure 25A:
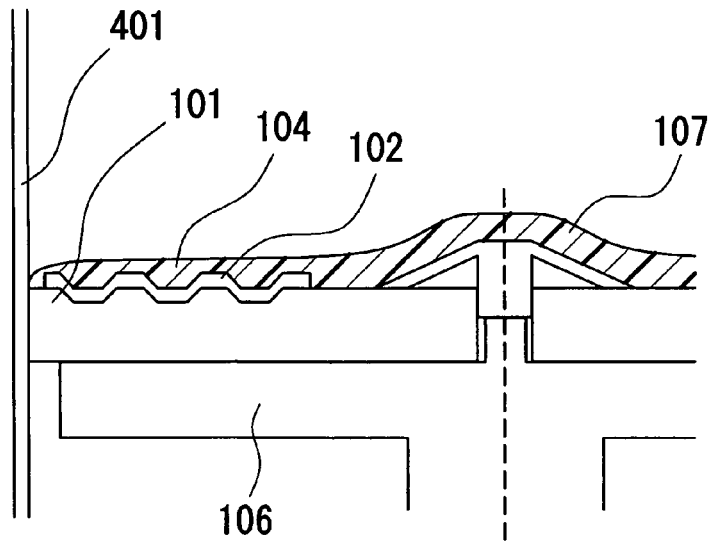
FIG. 25A is a diagram showing a burr-removing member in the shape of a cord placed adjacent to the substrate.

Referring to FIG. 25A, in this embodiment, a cord-shaped member 401 is used for removing the burrs generated at the outer end of the substrate 101. The cord-shaped member 401 is provided in the vertical direction so as to be in contact with the end face. This member can bring about the same effect as the member 103 in Fifth Embodiment. The cord-shaped member 401 is kept under a certain tension so as to be in contact with the outer end of the substrate 101.

Figure 25B:
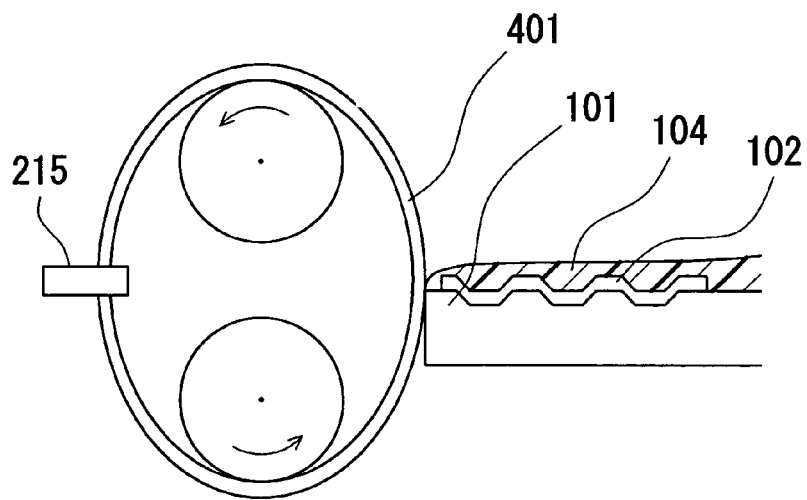
FIG. 25B is a diagram showing a configuration in which the cord-shaped burr-removing member is formed into an annular ring and placed adjacent to the substrate.
Figure 26A:
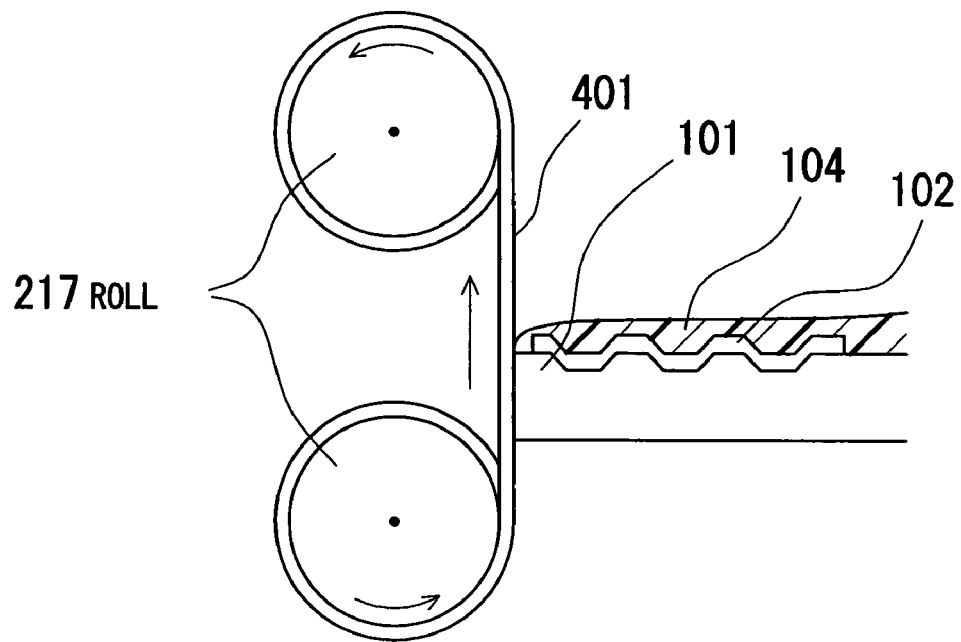
FIG. 26A is a diagram showing a burr-removing member in the shape of a cord, which is fed from a roll and wound onto another roll.

For example, as shown in FIG. 25B, the cord-shaped member 401 is formed into an annular ring shape and rotated while being in contact with the outer end of the substrate 101. The radiation cure type resin 104 adhering to the member 401 is removed by a removing device 215. Such a system can recover the resin and provide increased production efficiency. Referring to FIG. 26A, the cord 401 may be supplied from a roll 217 and recovered onto a roll 217 together with the radiation cure type resin 104 attached to the cord. Such a system can fully recover the resin, even when the removing device 215 does not have enough performance to remove the resin.

The cross section of the cord-shaped member 401 may be in any shape, specifically in the shape of a circle, an ellipse, a rectangular, or the like. It is preferred that the material and the surface condition for the cord-shaped member 401 should be determined depending on friction with the substrate and the degree of the effect of eliminating burrs.

Similarly to Fifth Embodiment, the shielding plate may also be used for preventing the radiation cure type resin 104 attached to the member 401 from being cured, or the steps of spreading and curing the radiation curing resin may independently be carried out in different places.

Seventh Embodiment

Figure 27:
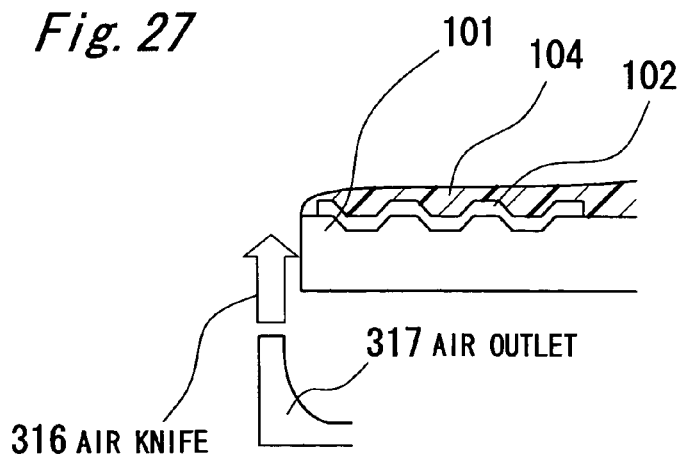
FIG. 27 is a diagram showing an air knife as means for removing burrs.

In this embodiment, a high pressure gas ejected from a certain outlet (hereinafter referred to as "air knife") is used for removing burrs in place of the member 103 provided at the outer end of the substrate 101. Referring to FIG. 27, an air knife 316 is ejected by high pressure from an air outlet 317 below the substrate 101 and applied to the outer end, so that the same effect can be achieved as in Fifth Embodiment with the member 103.

In Fifth Embodiment, attention should be paid not to cure the radiation cure type resin 104 attached to the member 103. When the air knife 316 is used, there is no need to pay such attention, and therefore the production efficiency can significantly be increased. The air knife 316 is preferably ejected immediately before the radiation cure type resin 104 is cured by radiation irradiation.

In the method as shown in FIG. 27, the air knife 316 is output from the air outlet 317 below the substrate 101 toward the outer end of the substrate 101. Alternatively, the air knife 316 may be applied from above or in a slanting direction to the outer end of the substrate 101. The air knife 316 may be applied to one portion or different portions of the substrate 101. The air knife outlet 317 may have a doughnut-shaped outlet opening with a radius substantially equal to that of the substrate 101. Such an air knife outlet 317 can apply the air knife 316 to the entire periphery of the substrate 101 at the same time.

Eighth Embodiment

Referring to FIGS. 28A and 28B, in this embodiment, a member 402 for removing burrs is in the shape of a circular plate and placed in such a manner that the level of its top face is substantially equal to or slightly higher than that of the surface of the substrate 101 having the signal recording layer 102. The member 402 is adapted to be rotated by the rotation of the substrate 101.

The member 402 is rotated by the rotation of the substrate 101 in the reverse direction to the substrate 101 at substantially the same peripheral speed. The rotated member 402 can more effectively remove the unnecessary radiation cure type resin 104 at the outer end of the substrate 101. The burrs can be prevented at the outer end even when radiation is applied to cure the radiation cure type resin 104 on the substrate 101 being rotated. In this embodiment, the member 402 uses such a mechanism that it is driven by the rotation of the substrate 101. Alternatively, a drive mechanism for rotating the member 402 may be so provided that the member 402 can be rotated by independent driving force. In such a drive mechanism, when the member 402 rotates in the same direction as the substrate 101 or linear speed of the outer end of the member 402 is different from that of the substrate 101, high friction can be generated between the substrate 101 and the member 402, so that uniformity of the optically transparent layer can be degraded. Therefore, the member 402 and the substrate 101 are preferably rotated in the reverse direction at substantially the same linear speed of the outer end.

During the rotation of the member 402, The radiation cure type resin which adhere to the rotated member 402 can fly out to the substrate 101 again as a droplet. In such a case, the optically transparent layer can be formed with increased variations in thickness. Therefore, a device 415 for removing the radiation cure type resin is preferably provided at the portion of the member 402 which is not in contact with the substrate 101.

Figure 26B:
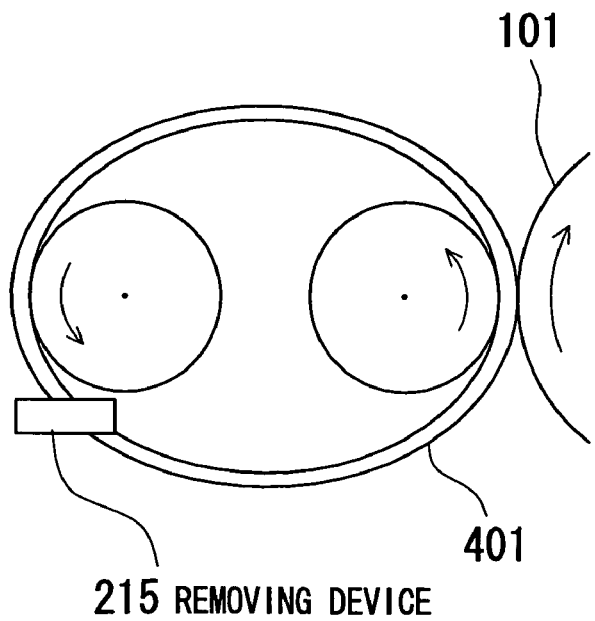
FIG. 26B is a diagram illustrating a burr-removing member in the shape of a cord (or belt) placed horizontal to the principal surface of the substrate.

In place of the above circular member 402, the cord or belt-shaped member 401 as in the above embodiments may be provided as shown in FIG. 26B, wherein the member 401 is placed in the horizontal direction with respect to the surface of the substrate 101 and rotated so that the same effect can be achieved.

As in Fifth Embodiment, the member 402 may be in contact with the substrate 101 or separated from the substrate 101 with a little distance (for example, 1 mm). The easiness of generating burrs may vary depending on the viscosity of the radiation cure type resin 104 or the number of revolutions. It is therefore preferred that an optimal distance between the member 402 and the substrate 101 is determined depending on each condition.

Ninth Embodiment

In Fifth Embodiment, both the step of applying/spreading the radiation cure type resin and the step of curing the resin on the substrate being rotated are carried out in the same place. During radiation irradiation, the shielding plate or the like may be used to prevent the spun-off resin from being irradiated. Even in such a case, the spun-off resin can be cured little by little, if a slight leak of the radiation is accumulated. In such a case, the recovery and reuse of the radiation cure type resin can not be done well and thus the cost can be high.

In each of Fifth to Eighth Embodiments, therefore, the process preferably includes the steps of: applying and spreading the radiation cure type resin; then stopping the rotation of the substrate and transferring the substrate to a different place; and curing the resin on the substrate being rotated in the different place, as in Third Embodiment.

Figure 29:
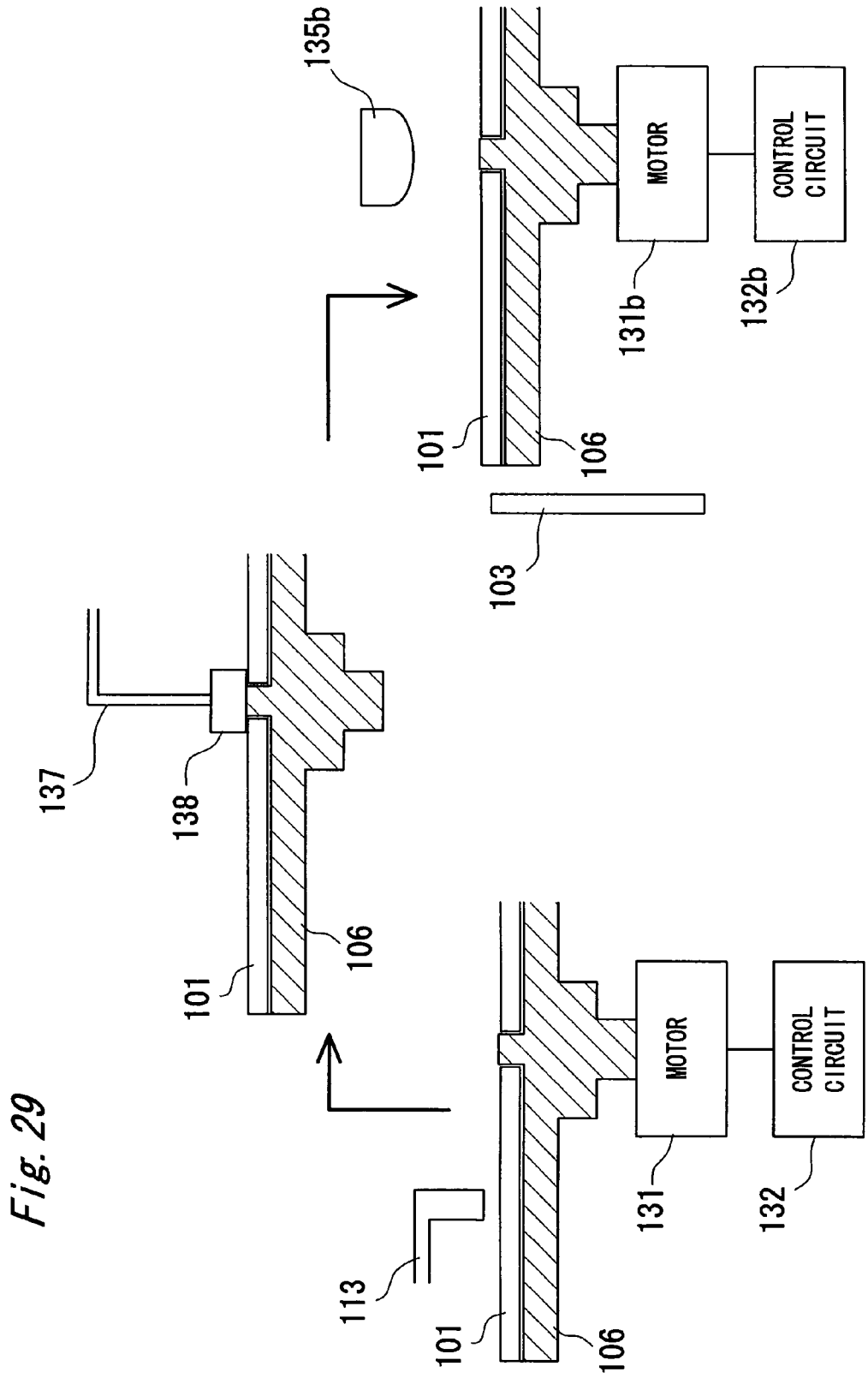
FIG. 29 is a diagram showing a configuration of an apparatus for carrying out a method of manufacturing the optical information recording medium, in which the process of supplying, applying and curing the resin are independently performed in the respective places, resulting in suppressing the generation of burrs.

FIG. 29 shows a configuration of an apparatus for such a process. The member 103 for preventing burrs at the outer end of the substrate 101 may be provided only in the place where the radiation is irradiated. Since the two steps are carried out in separated places, the apparatus can be simplified.

Tenth Embodiment

Figure 30A:
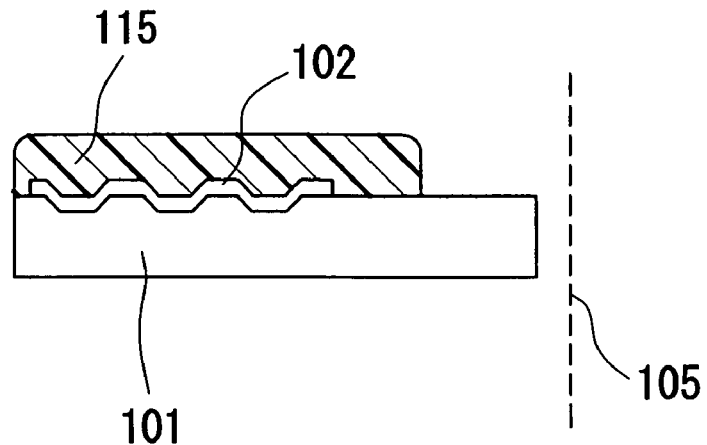
FIGS. 30A to 30C are diagram s each showing a structure for correcting the asymmetry of the optical information recording medium.

Referring to FIG. 30A, the optical information recording medium (disk) obtained in each of the above embodiments is an asymmetrical disk having the optically transparent layer 115 provided on one principal surface of the substrate 101. It is known that the optically transparent layer 115 produced by curing the radiation cure type resin can usually shrink at high temperature or undergo water absorption and expansion or dewatering and shrinkage depending on a change in atmospheric humidity. In the asymmetrically-structured disk, therefore, the tilt can significantly fluctuates with an increase in temperature or a significant change in humidity, which can lead to degradation of record or reproduction.

Figure 30B:
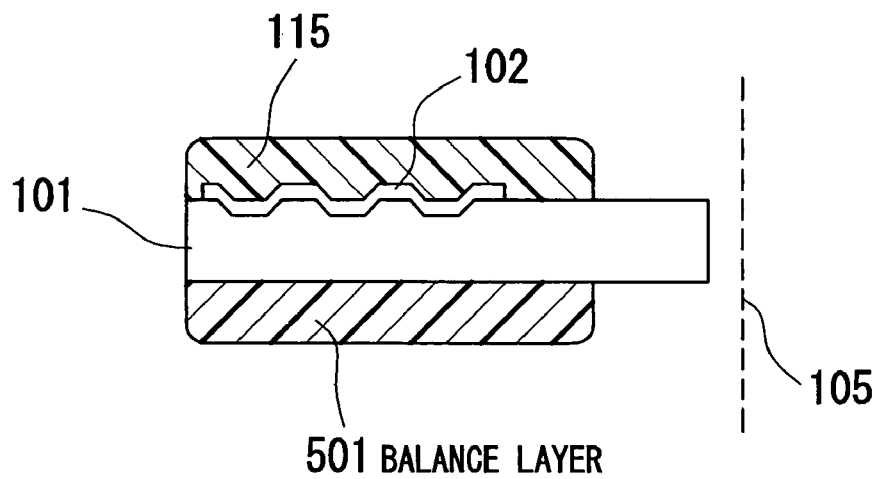
Figure 30C:
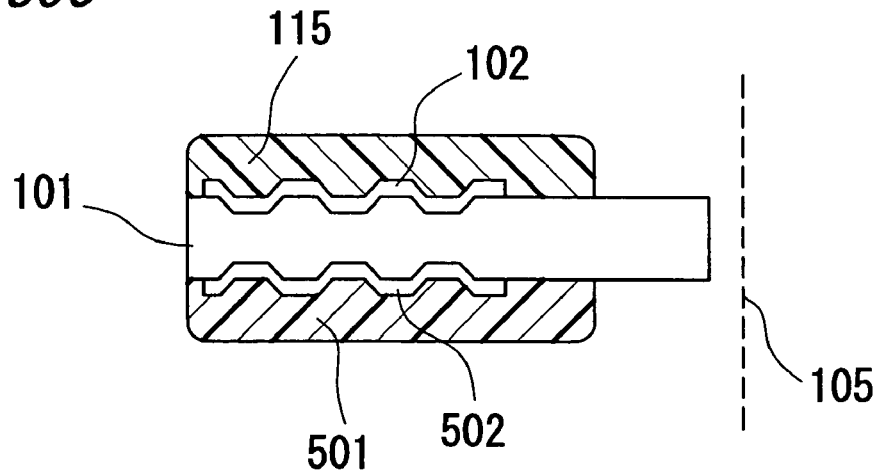

Referring to FIG. 30B, therefore, a layer (a balance layer) 501 similar to the optically transparent layer is formed on the surface (back surface) opposite to the surface having the signal recording layer 102, so that the asymmetry can be corrected. Such a structure can significantly reduce the change in tilt, which would otherwise be caused by a change in temperature or humidity. Referring to FIG. 30C, a signal recording layer 502 may also be provided on the back surface to form a double-sided recording/reproducing type disk, which is improved with respect to symmetry.

For the purpose of achieving high symmetry in such a structure, the layers formed on both surfaces are preferably substantially equal in material characteristics (such as characteristics on water absorption expansion or dewatering shrinkage (shrinkage characteristics) and thickness. If a different material is used to form the layer on the back surface, it is preferred that the thickness of the layer on the back surface should be changed based on the balance of a change in tilt. The protective layer 112 may also be formed on the back surface.

According to the manufacturing method of the optical information recording medium of the present invention, the optically transparent layer can be formed uniformly over the signal region of the substrate, though such a uniform optically transparent layer has been difficult to form by conventional spin coating methods. The outer end of the substrate can also be free from burrs which would otherwise be generated, by irradiating radiation to cure the radiation cure type resin on the substrate being rotated.

It will be understood that any combinations of the above-described embodiments, examples or technical ideas are available to those skilled in the art. Although the invention has been described in connection with specific embodiments, many other modifications, variations and applications are apparent to those skilled in the art. Therefore, the scope of the invention is not limited by the specific disclosure as provided herein but should be limited only by the appended claims.

The invention claimed is:

1. A method of manufacturing an optical information recording medium including a substrate having a signal recording layer formed on a principal surface thereof and an optically transparent layer comprising a radiation cure type resin formed on the signal recording layer, the method comprising:
    supplying the radiation cure type resin onto the substrate;
    applying the radiation cure type resin over the substrate by spinning the substrate;
    increasing a rotation speed of the substrate after said applying of the radiation cure type resin; and
    irradiating radiation to cure the radiation cure type resin during said increasing of the rotation speed of the substrate to form the optically transparent layer.

2. The method according to claim 1, wherein said applying of the radiation cure type resin and said irradiating of the radiation to cure the radiation cure type resin are independently carried out at different locations.

3. The method according to claim 1, wherein said irradiating of the radiation to cure the radiation cure type resin cures the radiation cure type resin within one second.

4. The method according to claim 1, wherein
    said supplying comprises supplying the radiation cure type resin onto different portions of the substrate located at a substantially same radius inside a region of the substrate where the signal recording layer is formed, and
    said applying of the radiation cure type resin over the substrate comprises spreading the radiation cure type resin.

5. The method according to claim 1, wherein the substrate has a central hole, and the method further comprises blocking the central hole with a member having a seal to prevent the radiation cure type resin from leaking to a portion of the substrate adjacent to the central hole during said supplying of the radiation cure type resin.

6. The method according to claim 5, wherein the substrate is mounted on a rotary table for said spinning, and means for pulling the member downward is provided to bring the member into contact with the substrate for said blocking.

7. The method according to claim 1, further comprising placing an end face portion of the substrate in an atmosphere containing an excess amount of oxygen during said irradiating of the radiation.

8. The method according to claim 1, further comprising stopping the spinning of the substrate after said applying of the radiation cure type resin and before said increasing of the rotation speed of the substrate.

9. The method according to claim 1, wherein said irradiating of the radiation comprises irradiating the radiation only to the substrate.

10. The method according to claim 9, wherein said irradiating of the radiation only to the substrate comprises using a shielding plate having a hole substantially equal to a shape of the substrate.

11. A method of manufacturing an optical information recording medium, the method comprising:

applying a radiation cure type resin over a substrate by spinning the substrate;

increasing a rotation speed of the substrate after said applying of the radiation cure type resin; and irradiating the radiation cure type resin with radiation during said increasing of the rotation speed.

* * * * *